United States Patent [19]

Watanabe et al.

[11] Patent Number: 5,707,289

[45] Date of Patent: Jan. 13, 1998

[54] VIDEO GAME SYSTEM HAVING TERMINAL IDENTIFICATION DATA

[75] Inventors: Kazuhiro Watanabe; Yoichiro Tsuda, both of Tokyo, Japan

[73] Assignee: Pioneer Electronic Corporation, Tokyo, Japan

[21] Appl. No.: 540,053

[22] Filed: Oct. 6, 1995

[30] Foreign Application Priority Data

Oct. 21, 1994 [JP] Japan .................. 6-282758

[51] Int. Cl.$^6$ .................................................. A63F 9/22
[52] U.S. Cl. .................................................. 463/40
[58] Field of Search ............... 463/42, 40, 29, 463/18, 17, 16; 364/410, 412; 275/439

[56] References Cited

U.S. PATENT DOCUMENTS

| | | | |
|---|---|---|---|
| 4,254,404 | 3/1981 | White | 463/42 |
| 4,572,509 | 2/1986 | Siturick | 463/42 X |
| 4,636,998 | 1/1987 | Harlick | 463/42 X |
| 4,652,998 | 3/1987 | Koza et al. | 463/42 X |
| 5,013,038 | 5/1991 | Luxenberg et al. | 463/42 |
| 5,051,822 | 9/1991 | Rhaldes | 463/41 X |
| 5,083,271 | 1/1992 | Thacher et al. | 463/42 |
| 5,083,800 | 1/1992 | Locktnn | 463/42 |
| 5,114,155 | 5/1992 | Tillery et al. | 463/42 |
| 5,251,909 | 10/1993 | Reed et al. | 463/40 X |
| 5,324,035 | 6/1994 | Morris et al. | 463/42 |
| 5,398,932 | 3/1995 | Eberhardt et al. | 463/42 X |
| 5,586,937 | 12/1996 | Menaishe | 463/41 |

*Primary Examiner*—Jessica Harrison
*Assistant Examiner*—Michael O'Neill
*Attorney, Agent, or Firm*—Nikaido, Marmelstein, Murray & Oram LLP

[57] ABSTRACT

A plurality of terminal devices through transmission lines, receive video game programs transmitted from a host. The host has a first memory storing the video game programs, and each terminal device has a second memory for storing video game programs sent from the host. The terminal devices is designated by a terminal device identification data. The video game program is constituted by a start packet, a data packet, and an end packet. The start packet includes a start packet identification code for indicating that the packet is a start packet, a first terminal device identification data for identifying the terminal device to which a video game program is transmitted, a game program identification data for identifying the video game program to be transmitted. The data packet includes a data packet identification code for identifying that the packet is a data packet, and data of the video game program, and the end packet includes an end packet identification code for indicating that the packet is an end packet, and a second terminal device identification data for identifying the terminal device which is to be inhibited from receiving the video game program thereafter.

3 Claims, 22 Drawing Sheets

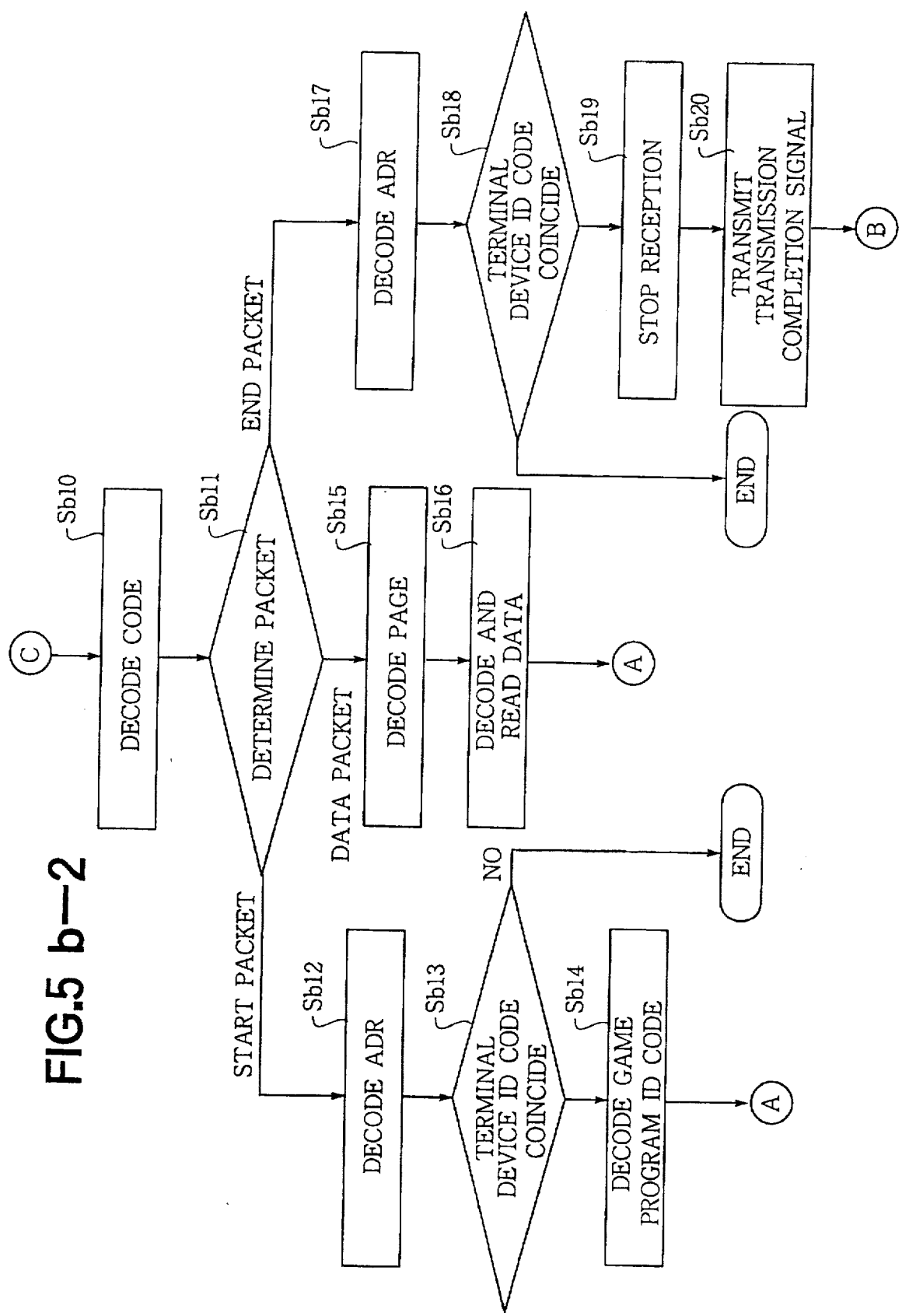

VIDEO GAME SYSTEM HAVING TERMINAL IDENTIFICATION DATA

BACKGROUND OF THE INVENTION

The present invention relates to a video game system having a host and a plurality of terminal devices each connected to the host through a transmission line and having a plurality of video game units.

Of various video game units installed in an amusement facility, some have memory devices such as a RAM and ROM wherein a video game program played on the game unit is stored. By setting another memory device, or by changing the program stored therein, various games can be played on the same unit.

There has recently been proposed a video game system wherein the game units are connected to a host of a game supplier through a transmission line, so that the game programs can be transmitted through the line and stored in the memory of each game unit. Thus a desired game program can be easily installed in the game units without exchanging the memory or the program stored therein, thereby improving the efficiency in managing the system.

However, since the game programs must be transmitted one at a time, when one or more game programs is transmitted to a number of game units, the efficiency is reduced. Namely, it takes time to transmit the game programs to all game units. When the length of the game program data is long comprising, for example, 200 Mbits, or when the number of the game unit to which the program is to be transmitted is increased, the efficiency is further decreased.

SUMMARY OF THE INVENTION

An object of the present invention is to provide a video game system where the game programs can be efficiently transmitted to a plurality of game units.

According to the present invention, there is provided a video game system for transmitting video game programs from a host to a plurality of terminal devices through transmission lines, the host having a first memory storing the video game programs, each of the terminal devices having a second memory for storing video game programs sent from the host, and a plurality of game units, each of which having a display for displaying the video game programs stored in the second memory.

Each of the terminal devices is designated by a terminal device identification data, and each of the video game programs is constituted by a start packet, a data packet, and an end packet.

The start packet includes a start packet identification code for indicating that the packet is a start packet, at least one first terminal device identification data for identifying the terminal device to which a video game program is transmitted, a game program identification data for identifying the video game program to be transmitted.

The data packet includes a data packet identification code for indicating that the packet is a data packet, and data of the video game program.

The end packet includes an end packet identification code for indicating that the packet is an end packet, and a second terminal device identification data for identifying the terminal device which is to be inhibited from receiving the video game program thereafter.

The other objects and features of this invention will become understood from the following description with reference to the accompanying drawings.

BRIEF DESCRIPTION OF DRAWINGS

FIGS. 5a and 5b-1 through 5b-3 are flowcharts describing operations of a host and one of the terminal devices in the system for transmitting and receiving a video game program, respectively;

FIGS. 12a and 12b-1 through 12b-3 are flowcharts describing operations of the host and the terminal device, respectively, for showing a playing instructions of the video game program;

DETAILED DESCRIPTION OF THE PREFERRED EMBODIMENTS

Figure 1:
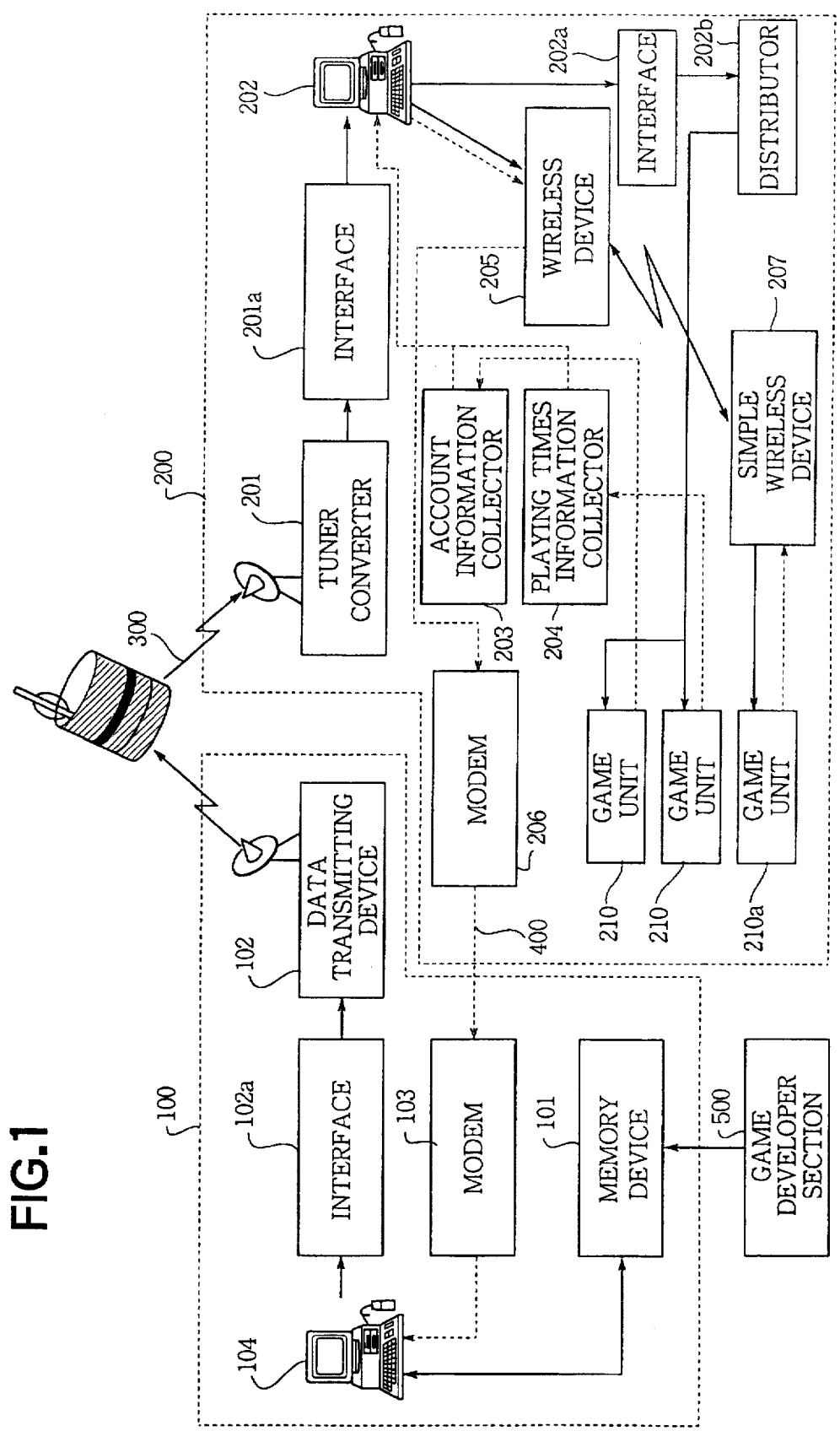
FIG. 1 is a block diagram of a video game system according to the present invention.
Figure 3:
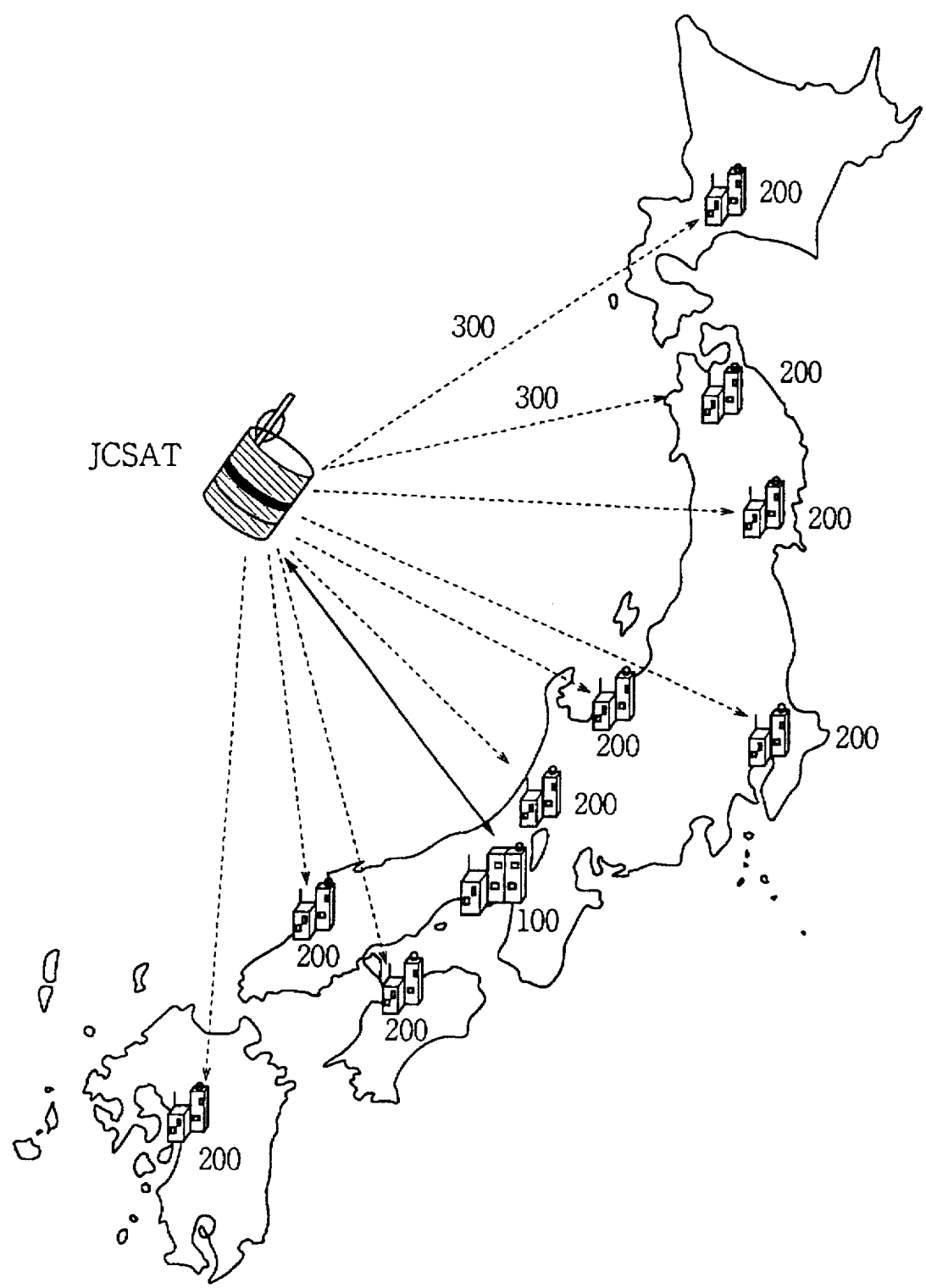
FIG. 3 is an illustration showing an example of the video game system wherein a plurality of terminal device are located all over Japan.

Referring to FIG. 1, a video game system according to the present invention comprises a host 100 of a game supplier and a plurality of terminal devices 200 each provided at amusement facilities or homes all over Japan as shown in FIG. 3, and connected to the host 100 through a satellite transmission line 300 incorporating a transmission satellite such as a JCSAT. The transmitting speed of the transmission line 300 is, for example 6 Mbps. The terminal devices 200 are further connected to the host 100 through respective telephone lines 400 for transmitting information such as an account information from each terminal device to the host 100. Only one of the terminal devices 200 is shown in the figure for the ease of explanation.

HOST 100

Provided in the host 100 are an information controlling computer 104 for controlling the operation of the host 100, a memory device 101 comprising a floppy disc or a hard disc, a data transmitting device 102 for transmitting information through the satellite transmission line 300. The memory device 101 stores a single or a plurality of video game programs and playing instructions for each game program and an identification program ID of each game program. A plurality of memory devices 101 are provided when only one program is stored in one device. The memory device 101 is connected to a game developer section 500 which develops various game softwares. The softwares are applied to the memory device 101 through a transmission line or stored in a memory medium which is carried from the developer section 500 and installed in the memory device 101. The program ID code allotted to each game program is also stored in an internal memory of the information controlling computer 104 together with a terminal ID code of each of the terminal devices 200 connected to the host and a game unit ID code of each of the game units provided in the terminal devices.

Upon operation of the information controlling computer 104, the information such as the video game program and the playing instructions thereof is derived from the memory device 101 and fed to the data transmitting device 102 through an interface 102a so as to be modulated. The modulated data is transmitted to the terminal device 200 through the satellite transmission line 300.

The host 100 is further provided with a modem 103 which demodulates data transmitted from the terminal device 200 to the host 100 through the telephone line 400. The transmitted data are, for example, an account information, that is an amount of money accumulated for playing each game, and playing times information on how many times each game was played. The data are fed to the information controlling computer 104 so as to determine whether to change the game program based on the information, and to select a new program from the memory 101.

TERMINAL DEVICE 200

The terminal device 200 comprises a tuner converter 210 which receives information from the host 100 through the satellite transmission line 300, data controller 202 and a plurality of game units 210. The video game program and the playing instructions transmitted from the host 100 are demodulated by the tuner converter 201 and fed through an interface 201a to the data controller 202 where error check and correcting operation thereof are executed. The accurate game programs and instructions are applied to a distributor 202b through an interface 202a and further to a plurality of game units 210. The data controller 202 has a memory for storing the terminal ID code of the present terminal device 200 and the unit ID codes of the game units 210 connected thereto.

Figure 2:
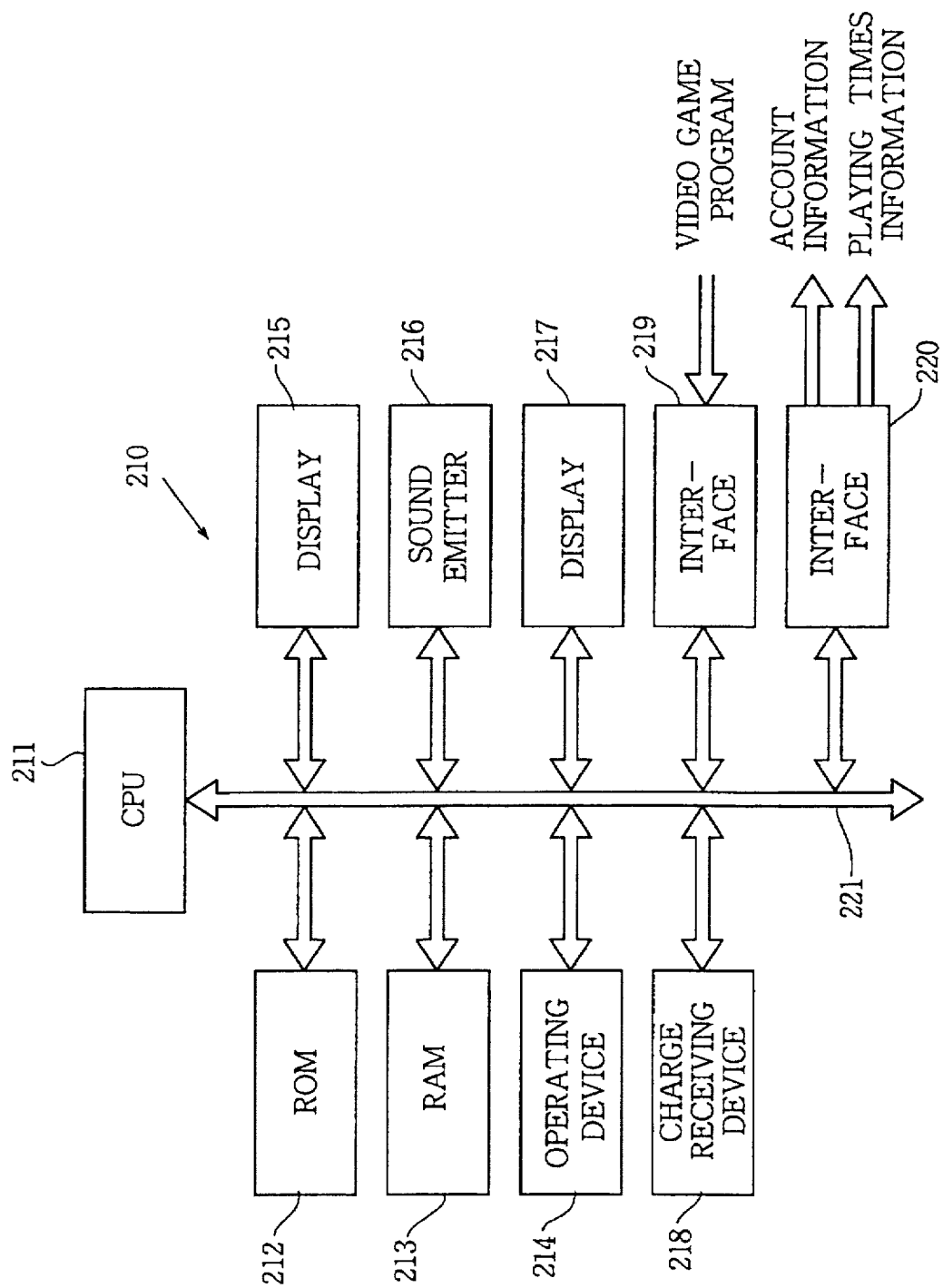
FIG. 2 is a block diagram of a game unit provided in the system of FIG. 1.

Referring to FIG. 2, each of the game units 210 is connected to the data controller 202 through interfaces 219 and 220. The game unit 210 comprises a CPU 211 for controlling the overall operation of the game unit, ROM 212 which stores a program for operating the CPU 211, RAM 213 for storing a plurality of video game programs, for example, four programs, transmitted from the host 100 and the ID codes thereof.

Further provided in the game unit 210 are an operating device 214 for selecting one of the video program stored in the RAM 213 and playing the game, display 215 such as a CRT display on which the game is shown, sound emitter 216 which emits sound effects accompanying the game, small-sized display 217 such as a liquid-crystal display for showing the playing instructions of the game, and a charge receiving device 218 in which a player inserts coins, bills or token money for playing the game. The devices provided in the game unit 210 are connected to each other through a bus 221.

Referring back to FIG. 1, the terminal device 200 is further provided with an account information collector 203 and a playing times information collector 204, each connected to the game unit 210 through the interface 220.

More particularly, in order to pay a video game on the game unit 210, a player inserts coins, bills or token money of a predetermined amount in the charge receiving device 218 thereof, and by operating the operating device 214, selects a game program of his choice stored in the RAM 213. The CPU 211 determines that a sufficient amount of money is inserted before executing the selected program. The account, together with the unit ID code and the program ID code are applied to the account information collector 203 through the interface 220 and stored therein. Furthermore, each time a video game is played, the program ID code thereof and the unit ID code are applied as the playing times information to the playing times information collector 204 through the interface 220 and stored therein. Only one of the account information collector 203 and the playing times information collector 204 may be provided.

The account information and the playing times information are applied to the data controller 202 which applies them to a wireless device 205. The wireless device 205 feeds the information to a modem 206 which modulates it so as to be transmitted to the host through the telephone line 400.

A game unit 210a is further provided in the terminal device 200. The data controller 202 applies the video game programs to the wireless device 205 through a wire transmission line. The wireless device 205 then transmits the game programs to a simple wireless device 207 through wireless. The simple wireless device 207 is connected to the game unit 210a through a wire, thereby storing the game programs in the game unit 210a. The account information and the playing times information of the game unit 210a are applied to the simple wireless device 207 and applied to the wireless device 205 through the wireless. the other construction and operation of the game unit 210a are the same as that of the game unit 210.

VIDEO GAME PROGRAM DATA FORMAT

Figure 4:
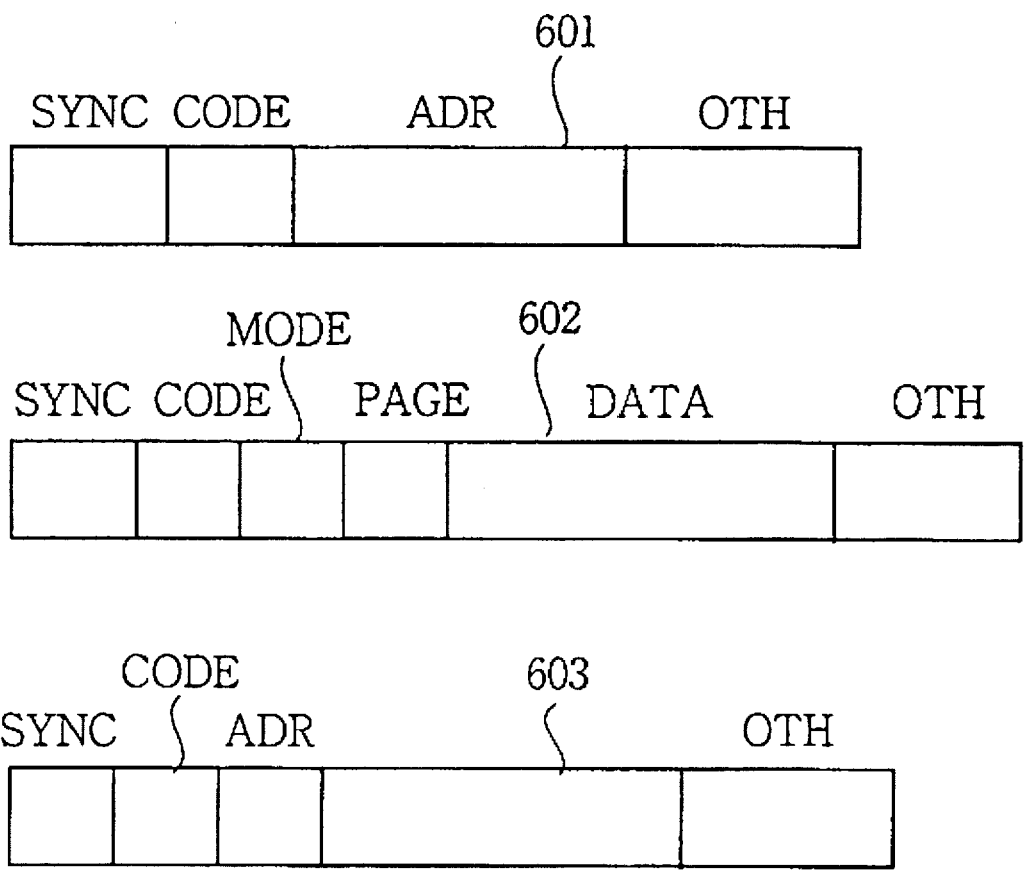
FIG. 4 is an illustration showing a format of data in the form of packets.

The data format for the video game programs is described hereinafter. Referring to FIG. 4, before being transmitted from the host 100, the game program data are divided into a plurality of packets, namely a start packet 601, a plurality of data packets 602 and an end packet 603. The game program data may comprise only the start packet 601 and the data packet 602.

The start packet 601 indicates that the transmission of the game program is started and comprises a synchronous code SYNC, start packet ID code CODE, address code ADR, other codes OTH. The synchronous code SYNC is a four-byte synchronous code of a double synchronous system. The start packet ID code CODE shows that the present packet is the start packet. The address code ADR comprises two-byte terminal device ID codes of a plurality of terminal devices 200 to which the video game program is to be transmitted, and a three-byte game program ID code indicating the video game program. The other codes OTH are a six-byte code which are to be used for storing, for example, a correcting code.

The data packet 602 comprises a four-byte synchronous code of the double synchronous system, a single byte data packet ID code showing that the packet is a data packet, a four-byte transmission page code PAGE, showing the order of the present data packet among other data packets, and game data DATA. Namely, the game program data is divided into a plurality of data, each allotted to the game data DATA of one of the data packets 602. The game data DATA comprises 256 Kbyte (8 Kbyte×32=256 Kbyte) or 2 Mbit. Other codes OTH are further provided in the data packet 602 for storing, for example, a correcting code and comprises about 16 Kbyte including a thirty-two-bit cyclic redundancy check (CRC) code.

The end packet 603 is transmitted after the video game program data is transmitted. The end packet 603 comprises a synchronous code SYNC, end packet ID code CODE, address code ADR and other codes OTH. The synchronous code SYNC is a four-byte synchronous code of a double synchronous system. The end packet ID code CODE shows that the present packet is the end packet. The address code ADR comprises two-byte terminal device ID codes of the terminal devices 200 to which transmission of the video game program is to be revoked. Other codes OTH are a six-byte code which is to be used for storing, for example, a correcting code.

TRANSMITTING A VIDEO GAME PROGRAM

The operation of the video game system is described hereinafter. First of all, the operation for transmitting a video game program from the host 100 to one of the terminal devices is described with reference to FIGS. 5a and 5b, each showing the operation of the information controlling computer 104 of the host 100 and data controller 202 of the terminal device 200, respectively.

Figure 5:
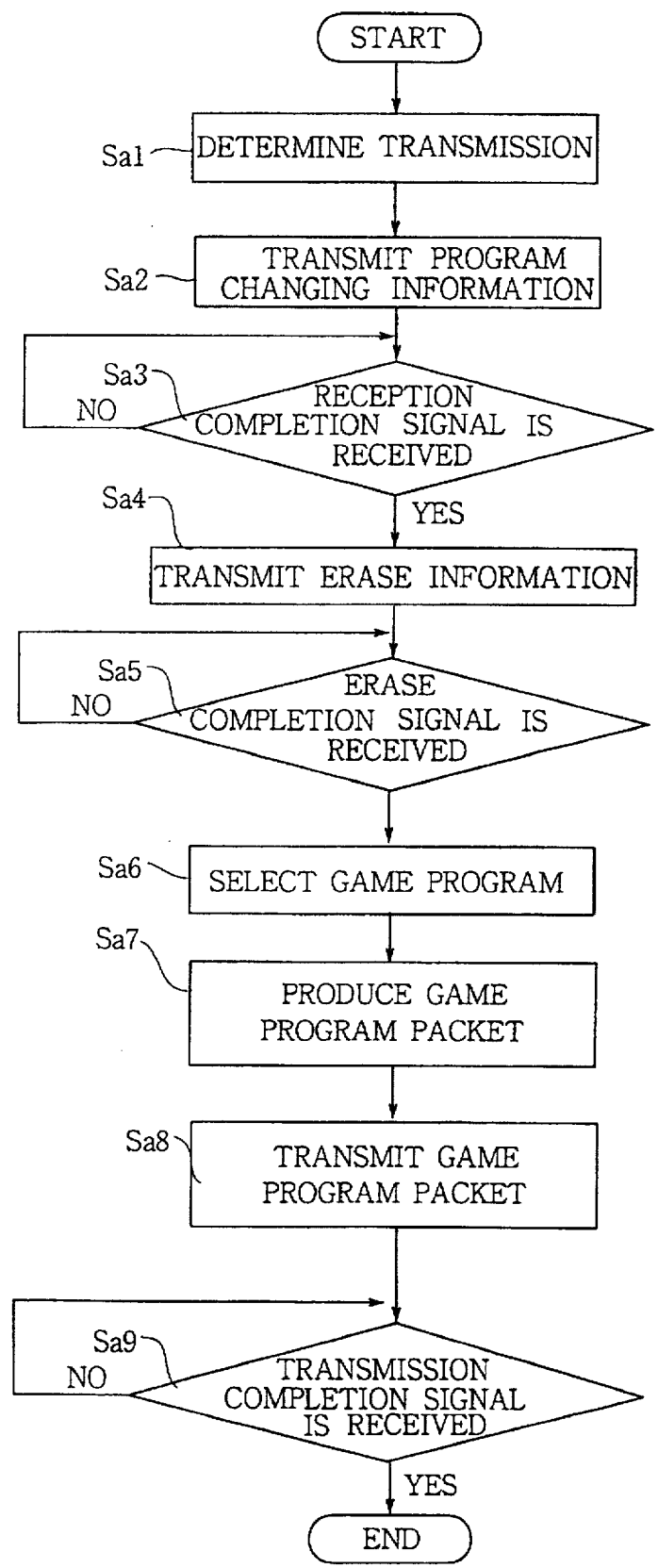
Figure 5:
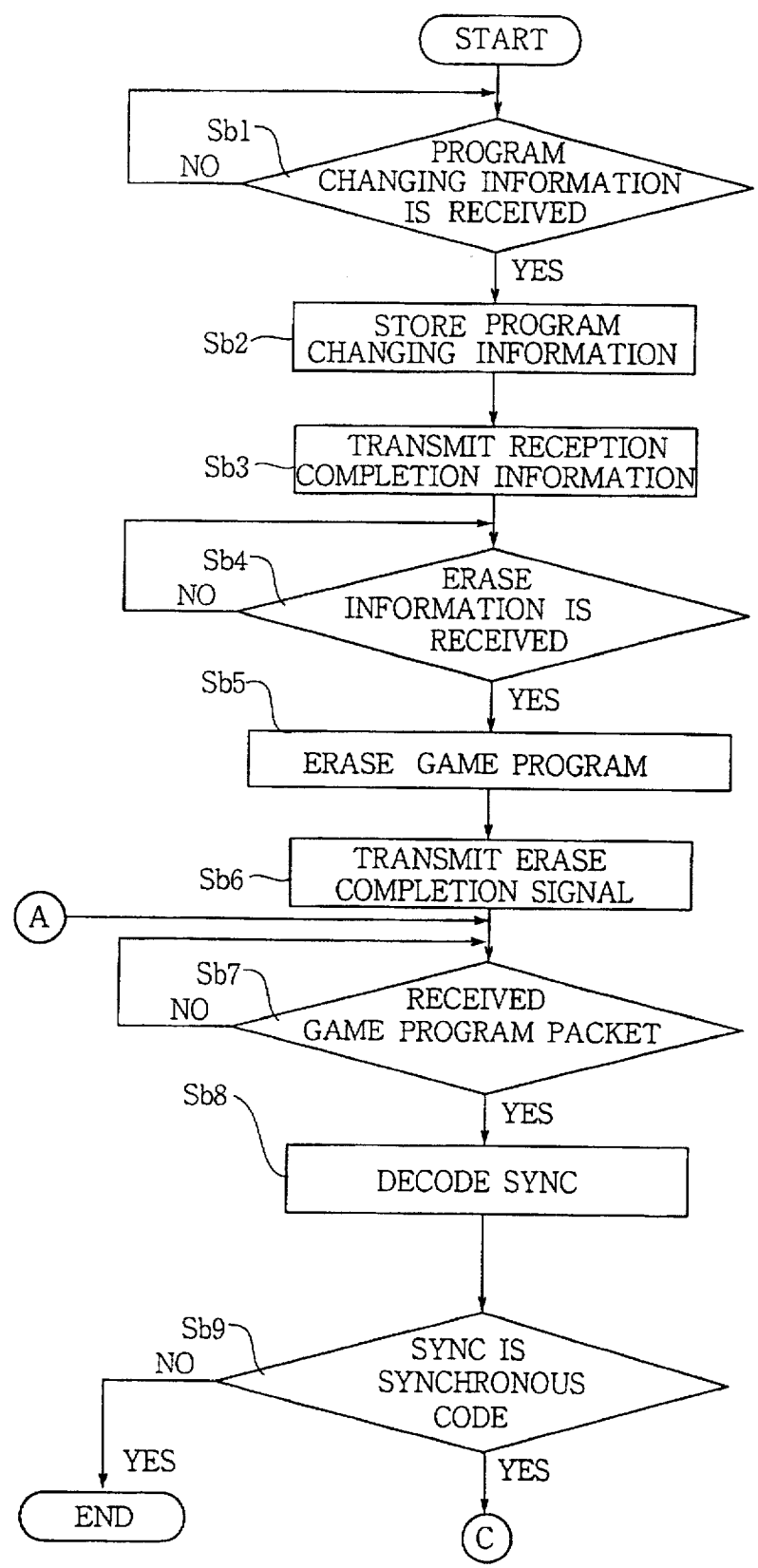
Figure 5:
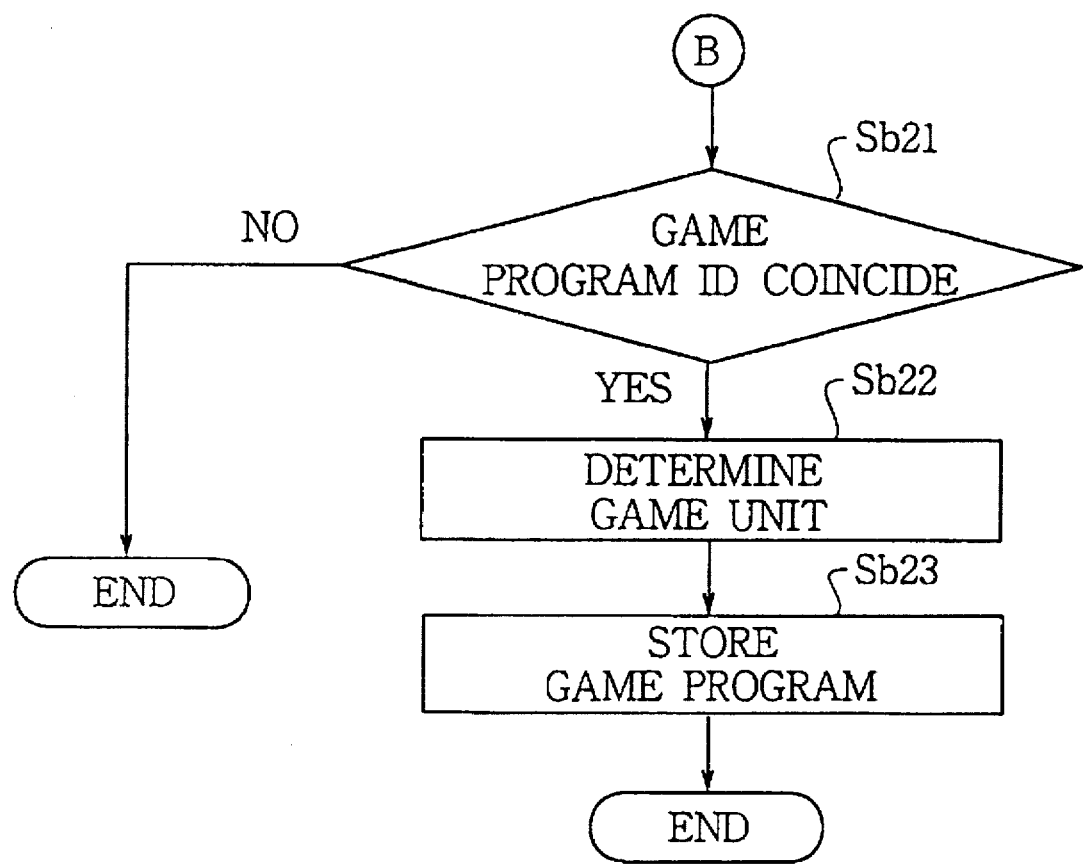

Referring to FIG. 5a, at a step Sa1, the information controlling computer 104 determines that a video game program is to be transmitted to one of the game units 210 of the terminal device 200. More particularly, the transmission of the video game program is executed periodically, upon a request from the user of the terminal device 200, or in accordance with information such as the account and playing times information.

In the case of a periodical, for example, a monthly transmission, the information controlling computer 104 checks the calendar provided therein and determines that the present day is the predetermined date of the transmission. Alternatively, the user of the terminal device 200 makes a request to the host 100 by such means as a telephone call to transmit a new video game program to a determined game unit 210. The operation for determining the transmission based on the information from the terminal device 200 will be later described in detail.

When the transmission is determined at the step Sa1 shown in FIG. 5a, at a step Sa2, information designating which of the game units 210 are operated to change the game program stored therein is applied to each terminal device 200. Namely, the information control computer 104 transmits program changing information in the form of a game changing packet 604 shown in FIG. 6a. The game changing packet 604 comprises a synchronous code SYNC, game changing code CODE for indicating the change of a game program, address code ADR, program ID code PRG of a new game program, and other codes OTH. The address code ADR includes the terminal ID code of the terminal device 200 concerned, and the game unit ID code of the game unit 210 which stores the game program to be replaced. The program changing information is transmitted to the terminal device through the interface 102a, data transmitting device 102 and the satellite transmission line 300.

The tuner converter 201 demodulates the transmitted game changing packet 604 and applies it to the data controller 202. After the data controller 202 determines that the program changing information is received at a step Sb1 of the program in FIG. 5b, the controller 202 compares the terminal ID code included in the game change packet 604 with the terminal ID code stored therein. When the ID codes coincide, the game unit ID code and the game program ID code are stored in the internal memory of the data controller at a step Sb2.

The data controller 202 thereafter applies a game program changing information reception completion signal to the modem 206 through the wireless device 205 at a step Sb3. Accordingly the completion signal is fed to the host through the telephone line 400. Alternatively, the terminal device 200 may be provided with a transmitting device such as the data transmitting device 102 of the host 100, in which case the completion signal may be transmitted to the host through the satellite transmission line 300.

Figure 6:
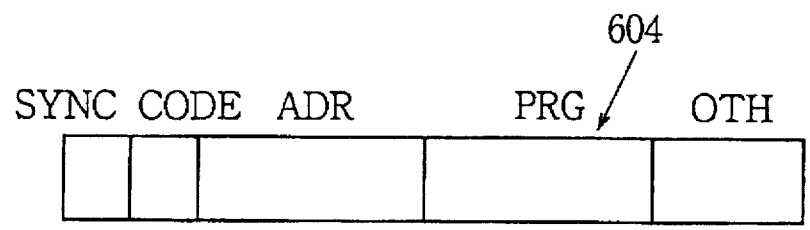
FIGS. 6a and 6b are illustrations showing examples of a game change packet and an erase packet, respectively.
Figure 6:
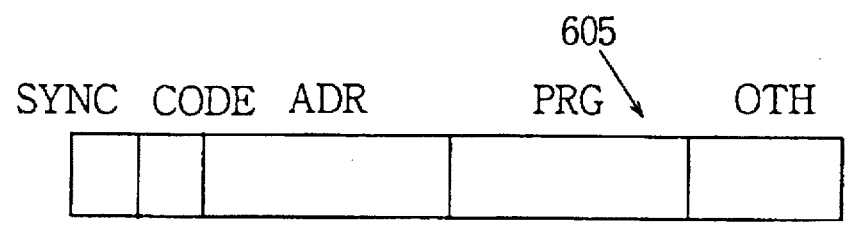

When it is determined at a step Sa3 shown in FIG. 5a that the reception completion signal is received, at a step Sa4, the information control computer 104 produces erase information in the form of an erase packet 605 shown in FIG. 6b. The erase packet includes a synchronous code SYNC, a code CODE indicating an erase instruction, an address code ADR including the terminal ID code of the terminal device 200 concerned, the game unit ID code of the game unit 210 which stores the game program to be erased, and the program ID code PRG of the game program. The erase information is transmitted to the data controller 202 of the appropriate terminal device 200 through the satellite transmission line 300. The game unit ID code of the erase packet 605 is usually the same as that of the game changing packet 604.

The tuner converter 201 demodulates the erase packet 605 and applies it to the data controller 202. After the data controller 202 determines that the erase information is received at a step Sb4 of the program in FIG. 5b, the controller 202 compares the terminal ID code included in the erase information with the terminal ID code stored therein. When the ID codes coincide, the controller designates one of the game units 210, the game unit ID code of which is included in the erase information and transmits the erase instruction to the CPU 211 thereof through the interface 219 (FIG. 2). The CPU 211 accordingly makes an access to the game program of the designated program ID which is stored in the RAM 213, thereby erasing the game program in the RAM 213 at a step Sb5. The CPU 211 then produces an erase completion signal which is fed to the data controller 202 and further to the host 100 through the telephone line 400 or the satellite transmission line 300 at a step Sb6. The erase packet 605 need not be provided with the game unit ID code and the game program ID code. In such a case the game program can be erased in accordance with the data included in the program changing packet 604 and stored at the step Sb2.

When the erase completion signal is received at a step Sa5 of FIG. 5a, the information controlling computer 104 selects predetermined one of the plurality of video game programs stored in the memory device 101 at a step Sa6. More particularly, the information controlling computer 104 indicates a program ID code of the selected video game program. An operator of the host 100 sees the ID code and picks out the memory device 101 such as a floppy disc on which the selected program is recorded. The memory device 101 is manually set in the data transmitting device 102 by the operator.

Alternatively, the information controlling computer 104 applies the program ID code and a game program select instruction to the memory device 101, so that the game program is automatically read out from the memory device 101 and applied to the data transmitting device 102.

At a step Sa7, the information controlling computer 104 produces a plurality of game program packets, each comprising the start packet 601, data packet 602 and the end packet 603. The number of the game packets vary dependent on the length of the game program. A cyclic redundancy check (CRC) code for checking errors in the data of the program, and a correcting code for correcting the data are appended to each packet as the other code OTH. The packets 601, 602 and 603 are fed to the data transmitting device 102 through the interface 102a. The transmitting device 102 modulates the packet which are then transmitted through the satellite transmission line 300 at a step Sa8.

The tuner converter 201 receives the game program packets at a step Sb7 and demodulates and applies them to the data controller 202 through the interface 201a.

The controller 202 decodes the synchronous code SYNC in the packet at a step Sb8 and determines that the packet is a header at a step Sb9. Thereafter, at a step Sb10, the ID code CODE is decoded. When it is determined at a step Sb11 that the decoded code CODE is the start packet code, the program proceeds to a step Sb12 where the address code ADR is decoded. When the decoded code coincides with the terminal code stored in the internal memory of the controller 202 at a step Sb13, the controller 202 is enabled to receive the next packet which is a data packet. At a step Sb14, the game program ID code of the address code ADR of the start packet is decoded, thereby enabling to recognize the game program which is hereinafter transmitted. The program then returns to the step Sb7 to wait for the next packet.

When the data packet is received, the program proceeds from the step Sb11 to a step Sb15 where the page code PAGE is decoded to determine the ordinal number of the present data packet. The game data DATA in the packet is decoded and read at a step Sb16. The steps Sb7 to Sb16 are repeated until all of the data of the video game program is read.

When it is determined at the step Sb11 that the ID code CODE of the transmitted packet is that of the end packet 603, the address code ADR thereof is decoded at a step Sb17. The terminal ID code included in the code ADR is compared with the terminal ID code stored in the controller 202 at a step Sb18. When the ID codes match, the permission of the reception of he packets is revoked at a step Sb19 so that the video game program is no longer received until the terminal ID in another start packet coincides with the stored ID code at the step Sb13 in the following routine. The controller 202 then applies a program reception completion signal indicating that the game program is received, to the host 100 through the satellite transmission line 300 or the telephone line 400 at a step Sb20.

If each packet is appended with the CRC code as the other codes OTH, errors in the game program are checked in accordance with the CRC code after the address code ADR and the game data DATA are read. When there is an error in the program, the data in the game program is corrected in accordance with the correcting code. The operation of the information controlling computer 104 ends with the receipt of the transmission completion signal at a step Sa9.

Meanwhile at a step Sb21, the data controller 202 compares the program ID code of the program changing information stored at the step Sb2 with the program ID code read at the step Sb14. The data controller further selects the game unit 210 having the same ID code as that of the program changing information at a step Sb22. The data controller 202 then applies a store instruction to the CPU 211 of the selected game unit 210 through the interface 202a and the distributor 202b so that the game program and the program ID code thereof are fed through the interface 220 and stored in the RAM 213 at a step Sb23.

The transmission completion signal may be transmitted to the host after the game program is stored in the RAM 213.

When the game unit ID code in the game program changing information is that of the game unit 210a, the store instruction, the game program and the program ID are transmitted to the simple wireless device 207 through the wireless device 205. The information is hence applied to the game unit 210a connected thereto.

In the above described embodiment, the game units 210 to which the new program is transmitted is determined by the host 100 and the ID code thereof is included in the game program changing information. However, the data controller 202 may be operated by the user of each terminal device to determine the game unit. In such a system, the game program changing information need not be transmitted from the host 100.

When the answer at each of the steps Sb9, Sb13, Sb18 and Sb21 is NO, or the ID code CODE designates none of the start, data and end packets at the step Sb11, an error signal may be transmitted to the host 100 through the satellite transmission line 300 or the telephone line 400.

TRANSMITTING VIDEO GAME PROGRAMS TO VARIOUS TERMINAL DEVICES

Figure 11:
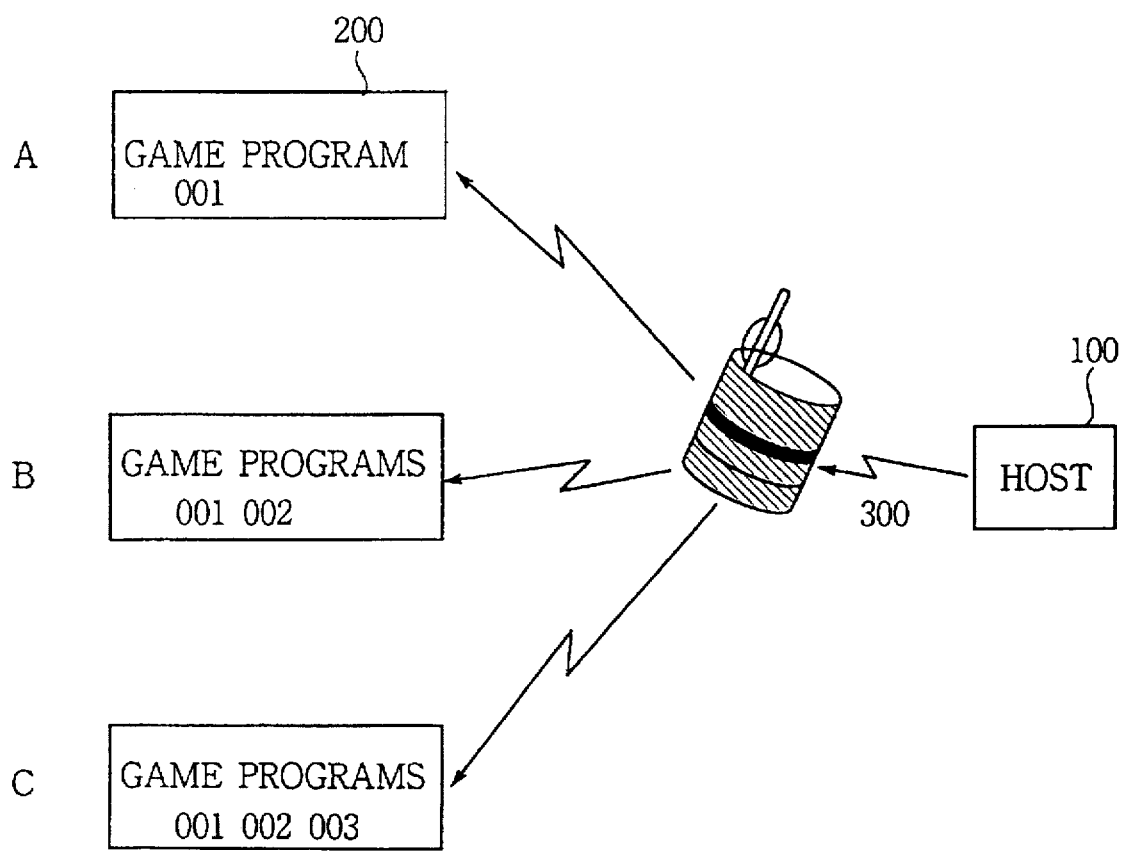
FIG. 11 is a diagram explaining the transmission of the video programs to various devices in accordance with the packets shown in FIGS. 7 to 10.

In accordance with the present invention, various game programs can be transmitted from the host 100 to particular terminal devices selected from a plurality of terminal devices 200, which selectively receives the game programs. More particularly, as shown in FIG. 11, when the host 100 simultaneously transmits three game programs 001, 002 and 003 to the selected three terminal devices A, B and C, the terminal device may be operated so that the terminal A received only the program 001, the terminal device B, the programs 001 and 002, and the terminal device C, all of the programs 001, 002 and 003.

Figure 7:
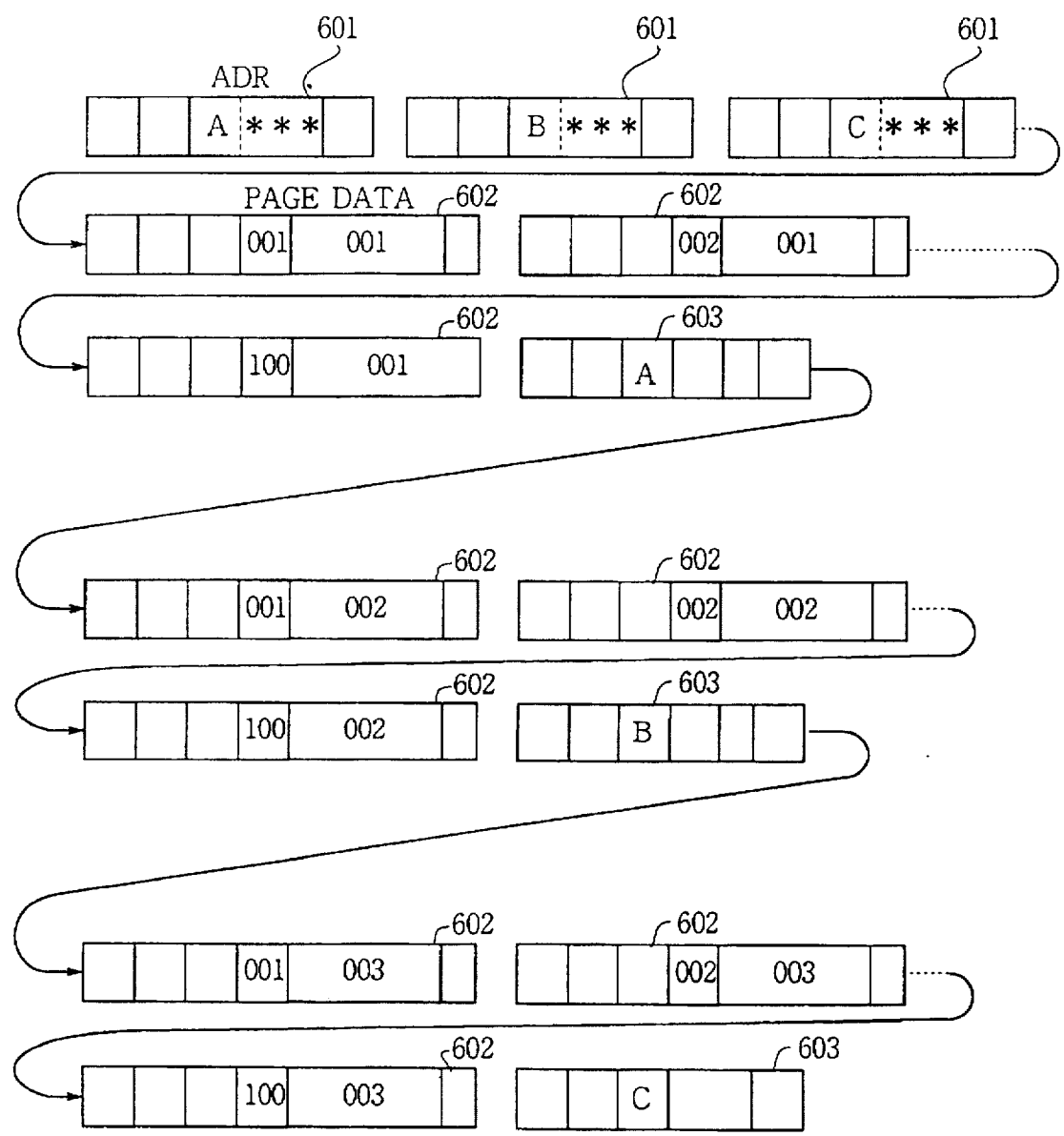
FIG. 7 is an illustration showing an example of packets for transmitting video game programs.

Referring to FIG. 7, three start packets 601 are transmitted. In each packet 601, a terminal ID code of one of the terminal devices A, B and C is appended as the address code ADR. Each start packet 601 is further appended with a program ID code "**" to indicate that all of the transmitted game programs can be received. Namely, when each of the terminal devices A, B and C receives the start packet 601 having the terminal ID codes thereof appended thereto, the code "**" is decoded so that the terminal device is informed that all of the game programs transmitted thereafter can be received.

Each of the game programs 001, 002, 003 is divided into a plurality of data packets 602 and transmitted in order. Each packet is allotted with a page number as the page code PAGE. In the present embodiment, each game program is divided into a hundred data packets 602, each having the page number 001 to 100. The terminal devices A, B and C receives each of these packets one by one to receive the entire game program 001.

When the transmission of the game program 001 is competed, the end packet 603 is transmitted. In the address code ADR of the end packet 603 is written the terminal ID code of the terminal device A as a terminal ID, so that only the terminal device A receives the end packet 603. Thus the reception of the further data packet is stopped in the terminal device A. Namely, only the game program 001 is stored in the terminal device A as shown in FIG. 11.

The game program 002 is also divided into a plurality of data packets 602 which are transmitted one by one. The terminal devices B and C receives the packets 602 so that the game program 002 is stored. When the transmission of the game program 002 is completed a second end packet 603 having the terminal ID code of the device B as the address code ADR is transmitted. Hence only the terminal B receives the end packet 603, thereby stopping the further reception of the data packets at the device B. Thus the game programs 001 and 002 are stored in the terminal device B as shown in FIG. 11.

Thereafter, the data packets 602 of the game program 003 and a third end packet 603 having the terminal ID code of the terminal device C as the address code ADR are transmitted to the terminal device C. Hence all of the game program 001, 002 and 003 are stored in the terminal device C.

Figure 8:
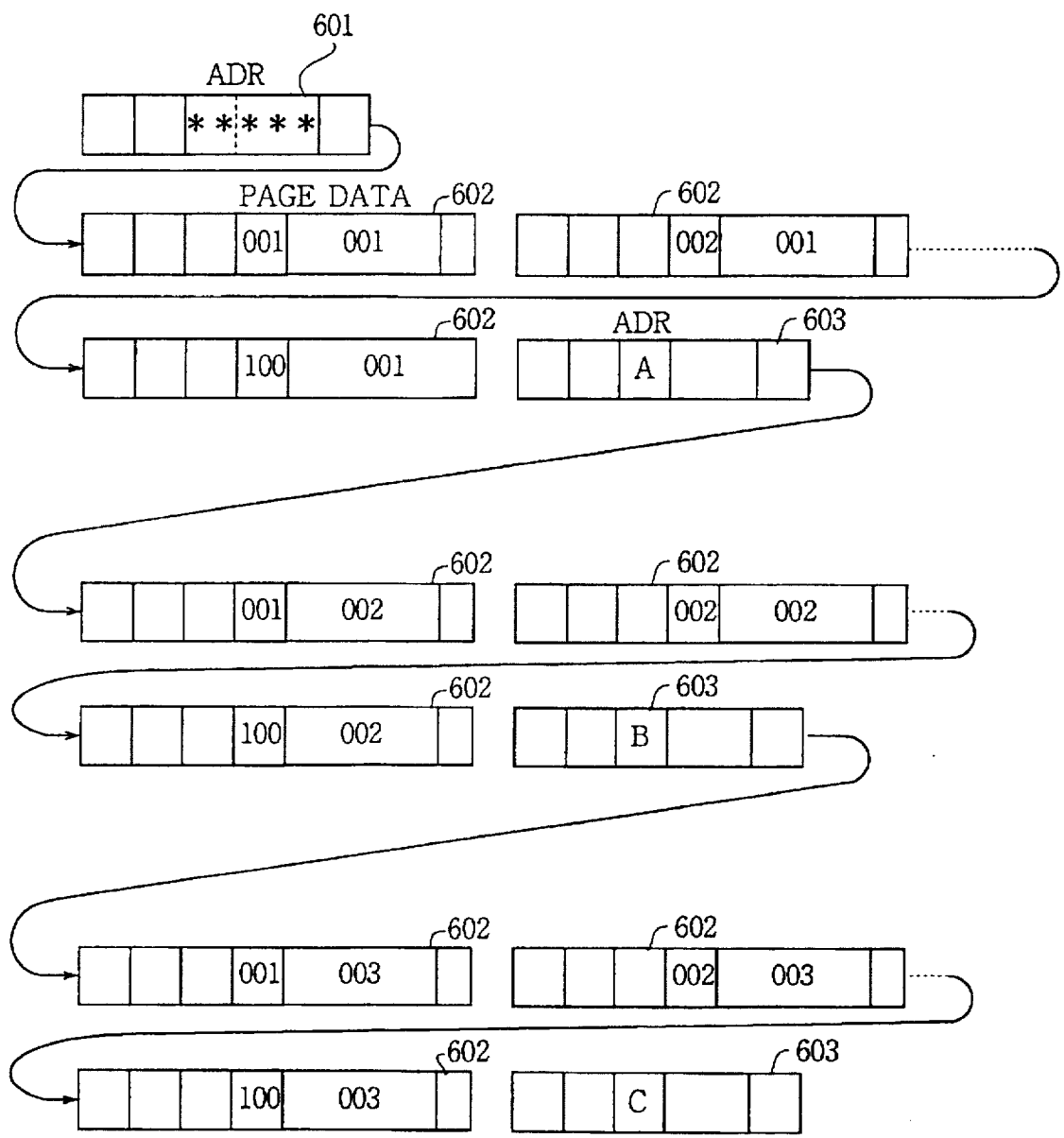
FIGS. 8 to 10 are illustrations each showing other examples of the packets for transmitting video programs.

FIG. 8 shows a modification of the packets 601, 602, 603 where the same results as above is obtained. The start packet 601 of the present modification comprises a single packet having an address code ADR of "" and "*". The code "" indicates that the transmission is addressed to all terminal devices A, B and C, and the code "*" indicates that all of the game programs are to be received. When each of the terminal devices A, B and C receives the start packet 601, codes "" and "*" are decoded so that it becomes possible for the terminal device to receive all of the game programs.

The game programs 001, 002 and 003 are divided into a plurality of data packets 602 which are transmitted one by one. After each game program is transmitted, the end packet 603 indicating the end of the reception for a predetermined terminal device is transmitted as in the first example shown in FIG. 7. Hence the terminal devices A, B, and C store the game programs as shown in FIG. 11.

Figure 9:
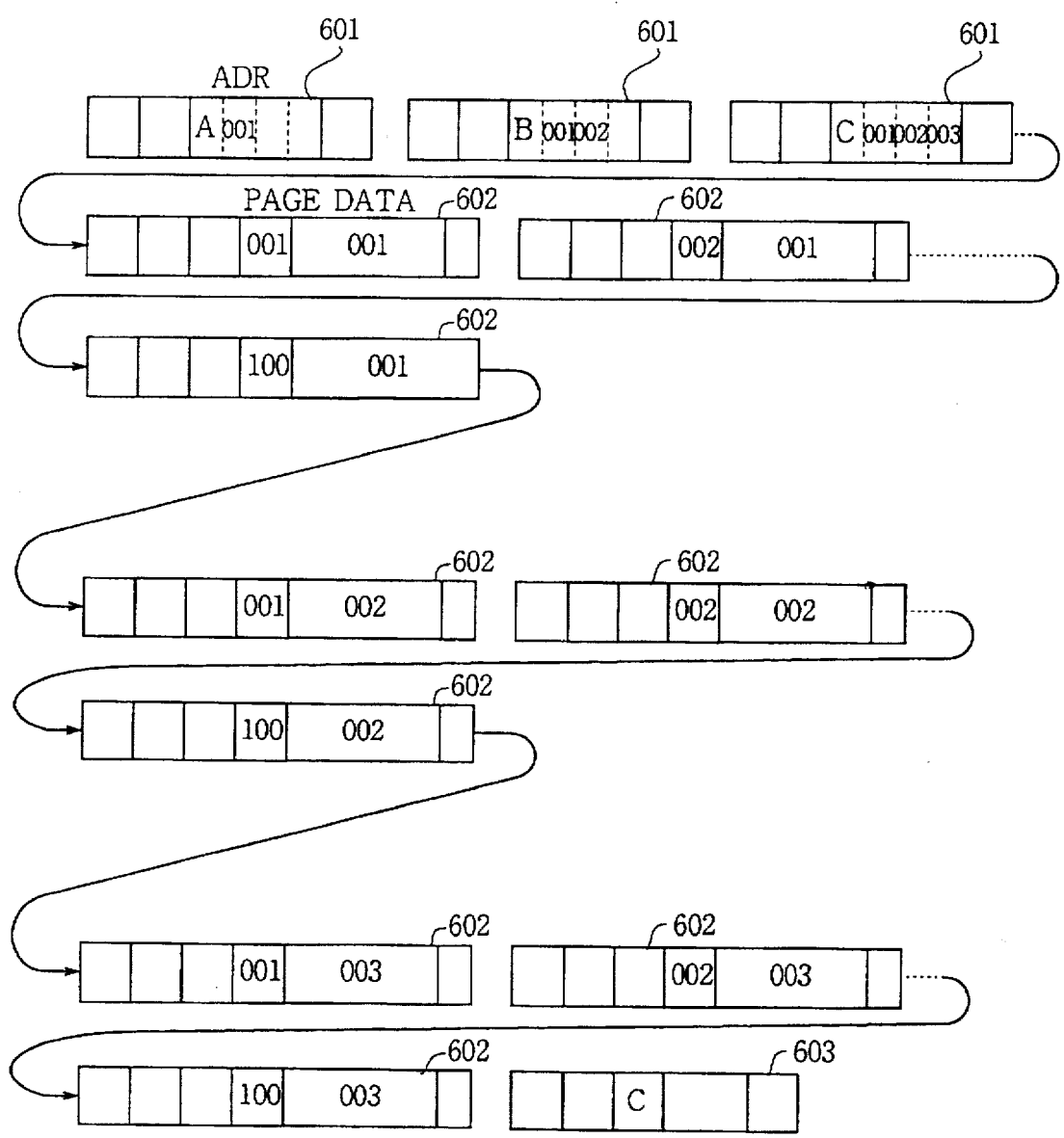

Referring to FIG. 9 showing another modification of the packets 601, 602, and 603, three start packets 601 are transmitted. The ID code of each of the terminal devices A, B and C is appended to one of the packets 601 as the address code ADR. Furthermore, program ID codes of all of the video game programs are appended to the packet with the corresponding terminal ID codes. Namely, the start packet 601 with the terminal ID code of the terminal device A has the program ID code 001, the start packet 601 with the terminal ID code of the terminal device B has the program ID codes 001 and 002, and so forth. When the terminal devices A, B and C receive the start packet 601 with the terminal ID code thereof, it is determined that, of the various game programs, only the game programs, the ID code of which is decoded, can be received.

Thereafter, the game program 001 divided into data packets 602 is transmitted. When all of the packets for the game program 001 is transmitted, since the terminal device A is allowed to receive only the game program 001, the reception id stopped. Namely, the last data packet 602 of the game program 001 is appended with a code indicating the end of the game program as the other codes OTH. Alternatively, the terminal device may be operated to detect the last packet based on the page code PAGE. In another example, and end packet may be transmitted between the data packets 602 of the game programs 001 and 002 as in the previous examples shown in FIGS. 7 and 8. Thereafter, the game programs 002 and 003 in the form of data packets 602 are successively transmitted. When all of the data packets 602 are transmitted, the end packet 603 having the ID code of the terminal device C is transmitted. Thus the terminal devices A, B and C store the game programs as shown in FIG. 11.

Figure 10:
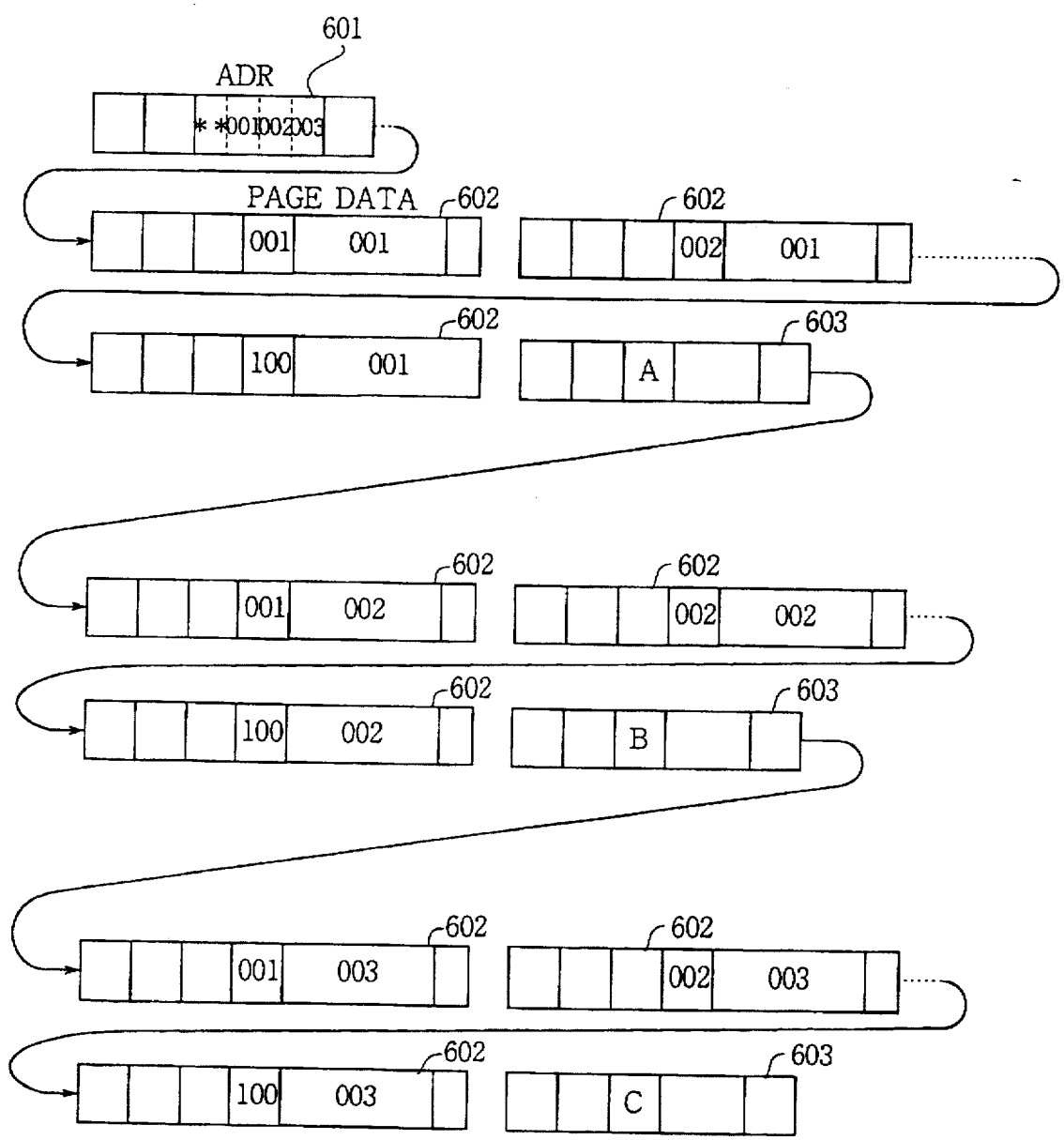

As shown in FIG. 10, only one start packet 601 may be transmitted. The start packet 601 has the terminal ID code "**" as the address code ADR indicating that all of the terminal devices are to receive the game programs, and the game program ID codes of all of the game programs 001, 002 and 003. Thereafter, the data packets 602 and the end packets 603 are transmitted as in the examples shown in FIGS. 7 and 8.

Thus, various game programs can be simultaneously transmitted to and stored in various terminal devices so that the transmitting efficiency is improved. More particularly, in order to transmit a game program of 200 Mbit, if each data packet is 2 Mbit, the game program must be divided into 100 packets. In the conventional system, 100 data packets must be transmitted for each terminal device. However, in the present invention, the 100 packets need be transmitted only once.

TRANSMITTING PLAYING INSTRUCTIONS

Figure 12:
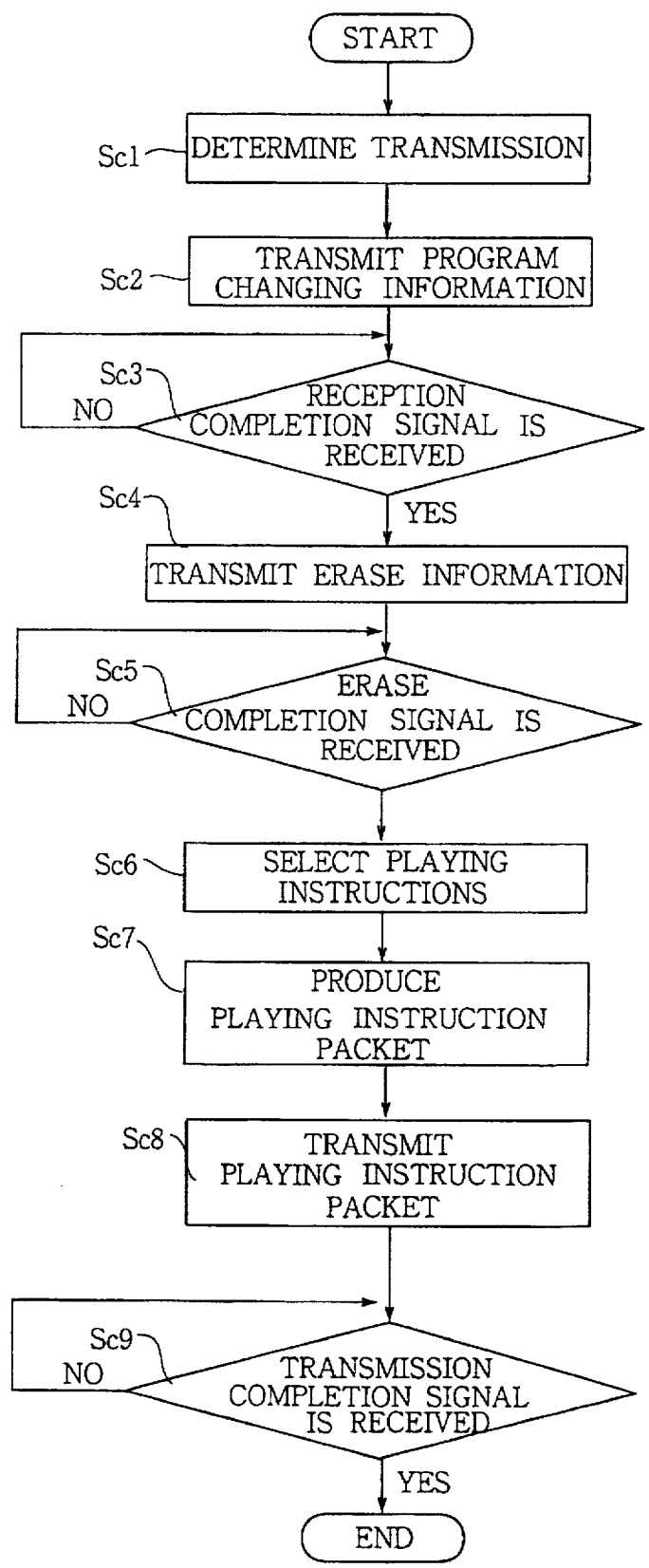
Figure 12:
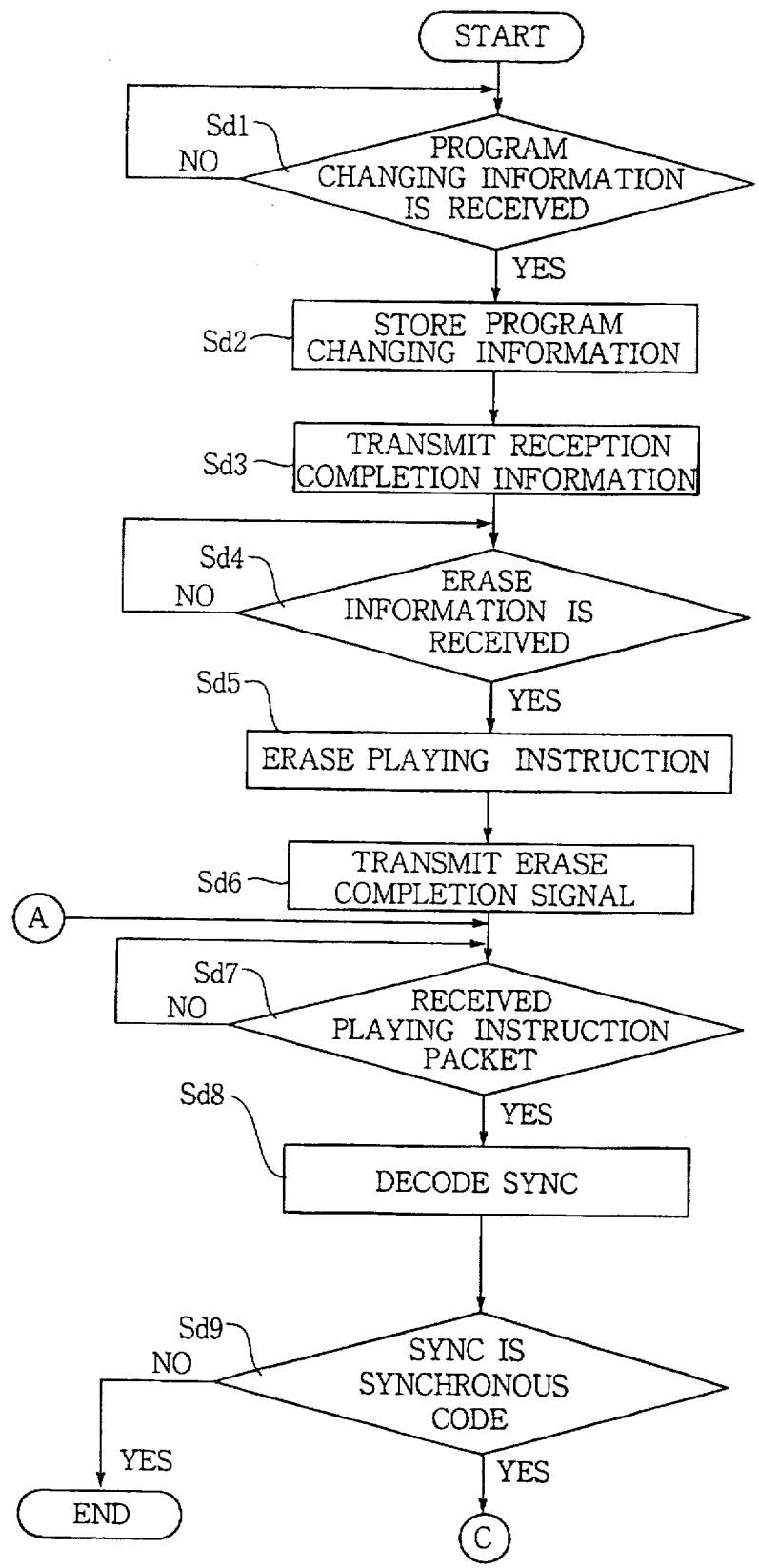
Figure 12:
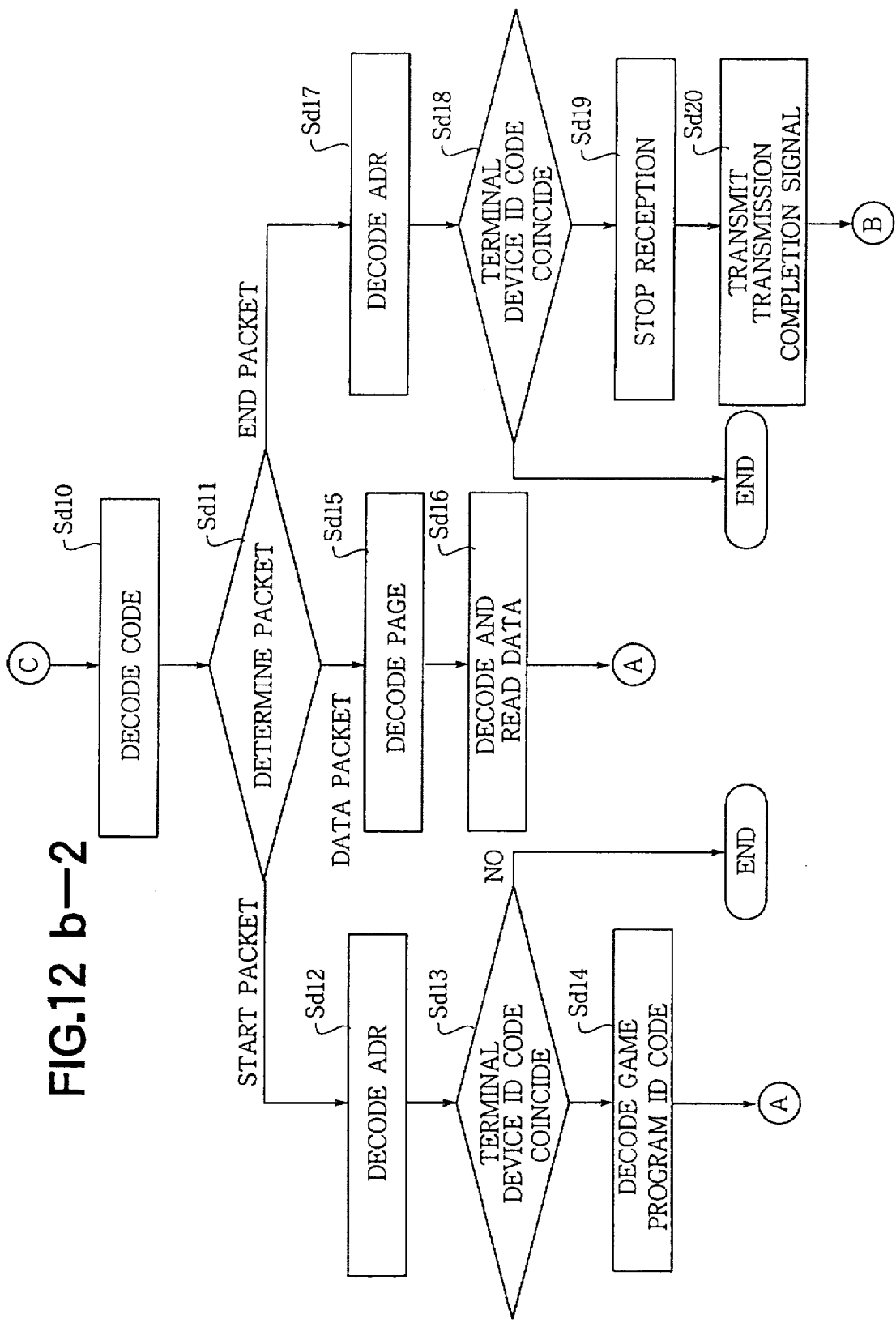
Figure 12:
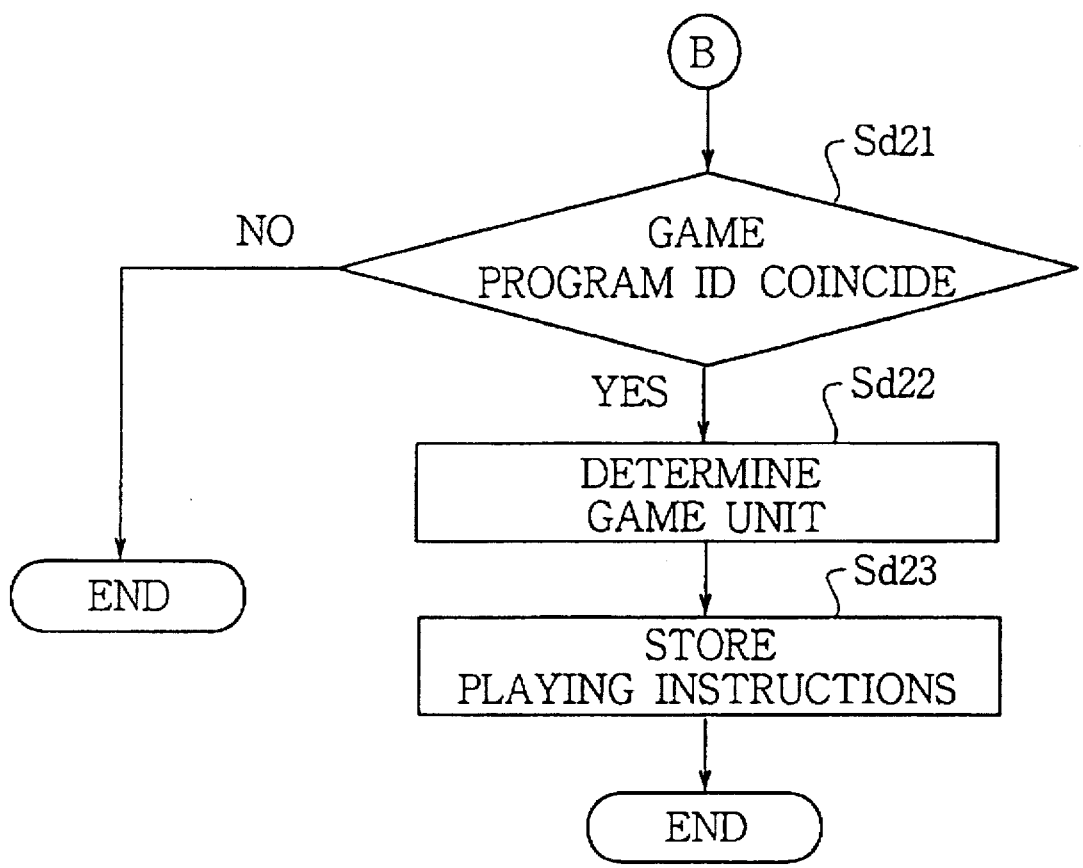

Referring to FIGS. 12a and 12b, playing instructions of the game program are also transmitted from the host 100 to the terminal device 200 before or after the game program is transmitted.

Referring to FIG. 12a, at a step Sc1, the information controlling computer 104 determines that playing instruction are to be transmitted to one of the game units 210 of the terminal device 200 before or after the transmission of the video game program is executed. At a step Sc2, the information control computer 104 produces program changing information and erase information both in the form of packets, thereby designating the playing instructions which are to be changed. The erase packet is the same as the erase packet 605 shown in FIG. 6b. A code indicating that the packet is for changing the playing instructions is included as the ID code CODE. The program changing information and the erase information are transmitted to the data controller 202 of the appropriate terminal device 200 through the satellite transmission line 300 (steps Sc2 to Sc5). If the playing instructions are to be changed after the game program is replaced, the program changing information need not be transmitted. The data controller 202 is operated at steps Sd1 to Sd3 in the same manner as at the steps Sb1 to Sb3 in FIG. 5b. Namely, the data controller 202 determines that the program changing information is received at the step Sd1 and applies a reception completion signal to the host 100 at the step Sd3. When the erase information is received at a step Sd4, the controller 202 compares the terminal ID code included in the information with the terminal ID code stored therein. When the ID codes coincide, the game unit ID code and the game program ID code are stored in the internal memory of the data controller at a step Sd2.

The data controller 202 applies a game program changing information reception completion signal to the host 100. After the data controller 202 determines that the erase information is received at a step Sd4, the controller 202 compares the terminal ID code included in the erase information with the terminal ID code stored therein. When the ID codes coincide, the controller designates one of the game units 210, the game unit ID code of which is included in the erase information and transmits the erase instruction to the CPU 211 thereof. The CPU 211 accordingly makes an access to the playing instructions of the designated program ID which is stored in the RAM 213, thereby erasing the game program in the RAM 213 at a step Sd5. The CPU 211 then produces an erase completion signal which is fed to the data controller 202 and further to the host 100 through the telephone line 400 or the satellite transmission line 300 at a step Sd6.

When the erase completion signal is received at a step Sc5 of FIG. 12a, the information controlling computer 104 selects predetermined one of the plurality of playing instructions stored in the memory device 101 at a step Sc6. More particularly, the information controlling computer 104 indicates a program ID code of the selected playing instructions. An operator of the host 100 sees the ID code and picks out the memory device 101 such as a floppy disc on which the selected program is recorded. The memory device 101 is manually set in the data transmitting device 102 by the operator.

Alternatively, the information controlling computer 104 applies the program ID code and a playing instructions select instruction to the memory device 101, so that the game program is automatically read out from the memory device 101 and applied to the data transmitting device 102.

At a step Sc7, the information controlling computer 104 produces a plurality of playing instructions packets, each comprising the start packet 601, data packet 602 and the end packet 603. The data packet 602 includes a display data DATA which is a playing instruction data. The packets 601, 602 and 603 are fed to the data transmitting device 102 through the interface 102a. The transmitting device 102 modulates the packets which are then transmitted through the satellite transmission line 300 at a step Sc8.

The tuner converter 201 receives the game program packets at a step Sb7 and demodulates and applies them to the data controller 202 through the interface 201a.

The controller 202 decodes the synchronous code SYNC in the packet at step Sd8 and determines that the packet is a header at a step Sd9. Thereafter, at a step Sd10, the ID code CODE is decoded. When it is determined at a step Sd11 that the decoded code CODE is the start packet code, the program proceeds to a step Sd12 where the address code ADR is decoded. When the decoded code coincides with the terminal code stored in the internal memory of the controller 202 at a step Sd13, the controller 202 is enabled to receive the next packet which is a data packet. At a step Sd14, the game program ID code of the address code ADR of the start packet is decoded, thereby enabling to recognize the playing instructions which is hereinafter transmitted. The program then returns to the step Sb7 to wait for the next packet.

When the data packet is received, the program proceeds from the step Sd11 to a step Sd15 where the page code PAGE is decoded to determine the ordinal number of the present data packet. The display data DATA in the packet is decoded and read at a step Sd16. The steps Sd7 to Sd16 are repeated until all of the data of the playing instructions is read.

When it is determined at the step Sd11 that the ID code CODE of the transmitted packet is that of the end packet 603, the address code ADR thereof is decoded at a step Sd17. The terminal ID code included in the code ADR is compared with the terminal ID code stored in the controller 202 at a step Sd18. When the ID codes match, the reception of the packets is revoked at a step Sd19 so that the playing instructions are no longer received until the terminal ID in another start packet coincides with the stored ID code at the step Sd13. The controller 202 then applies a program reception completion signal indicating that the game program is received, to the host 100 through the satellite transmission line 300 or the telephone line 400 at a step Sd20. If each packet is appended with the CRC code and the correcting code as the other code OTH, errors in the game program are checked in accordance with the CRC code after the address code ADR and the game data DATA are read. When there is an error in the program, the data in the game program is corrected in accordance with the correcting code. The operation of the information controlling computer 104 ends with the receipt of the transmission completion signal at a step Sc9.

Meanwhile at a step Sd21, the data controller 202 compares the program ID code of the program changing information stored at the step Sd2 with the program ID code read at the step Sd14. The data controller further selects the game unit 210 having the same ID code as that of the program changing information at step Sd22. The data controller 202 then applies a store instruction to the CPU 211 of the selected game unit 210 through the interface 202a and the distributor 202b so that the playing instructions and the program ID code thereof are fed through the interface 220 and stored in the RAM 213 at a step Sd23. Therefore, the CPU 211 reads out the playing instructions as required, and indicates them on the display 217. The packets of the data for the playing instructions are transmitted in the same manner as described in FIGS. 7 to 11.

Thus, it is not necessary to change a label showing the playing instructions whenever the game program is changed.

CHANGING A VIDEO GAME PROGRAM BASED ON ACCOUNT INFORMATION

Figure 13:
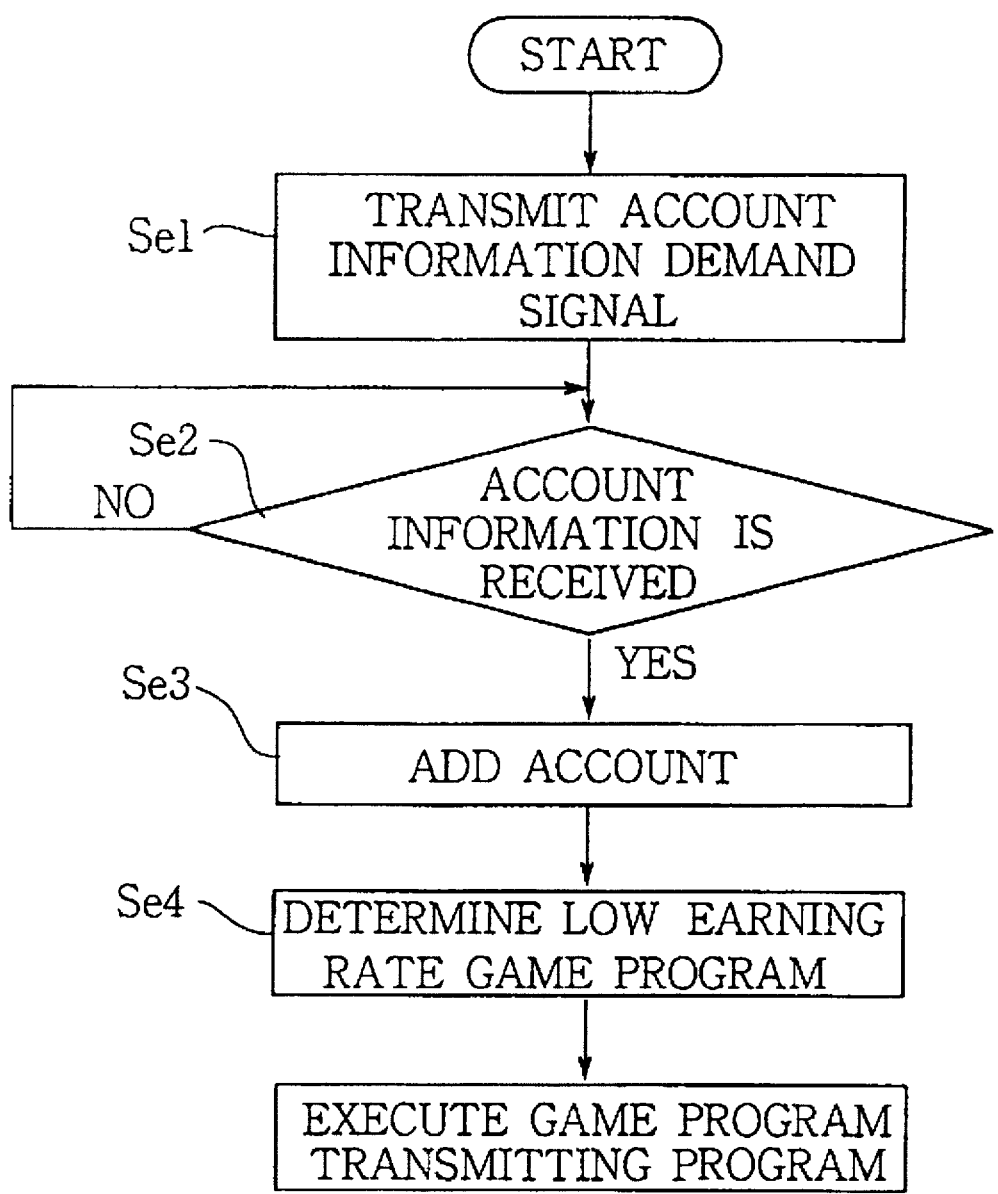
FIGS. 13a and 13b are flowcharts describing operations of the host and the terminal device, respectively, for replacing a video game program based on an account information.
Figure 13:
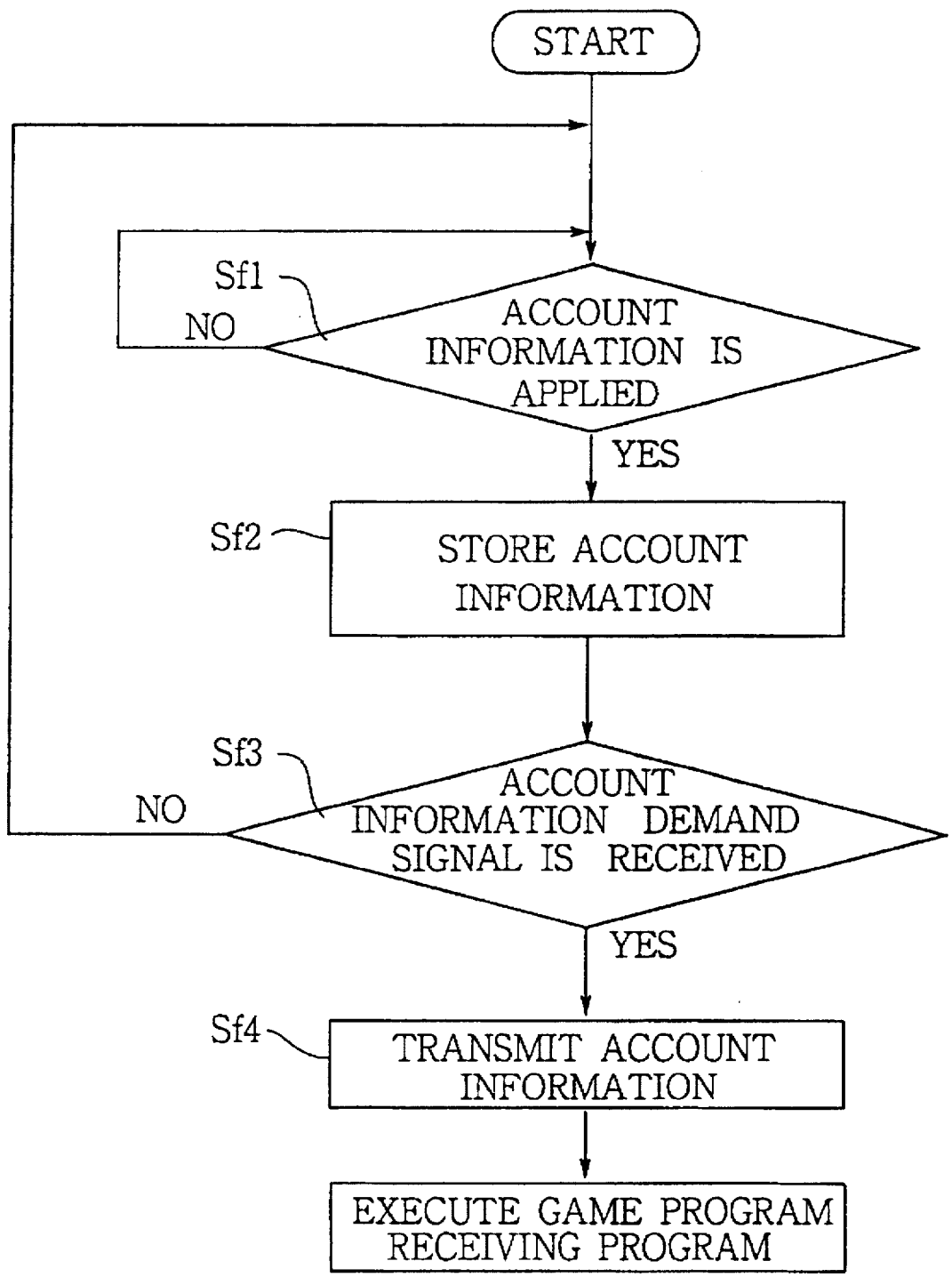

In accordance with the present invention, unpopular game programs stored in the game units 210 are automatically replaced with new programs. FIGS. 13a and 13b show operations of the information controlling computer 104 and the data controller 202, respectively, for changing the program in accordance with the account information.

Referring to FIG. 13b, the data controller 203 confirms at a step Sf1 that an account information including the amount of money inserted in the game unit and the ID codes of the game unit and the game program is applied from the game unit 210 to the account information collector 203. The account information together with the time and date of the transmission is stored in the account information collector 203 at a step Sf2.

Referring to FIG. 13a, at a step Se1, the information controlling computer 104 of the host 100 periodically, for example, once a month, applies an account information demand signal through the satellite transmission line 300 or the telephone line 400 to each terminal device 200 to have the account information stored in the account information collector 203 transmitted thereto. The data controller 202, detecting the demand signal at a step Sf3, retrieves the game unit ID codes, program ID codes, account information and the storing times and dates from the accounting information collector 203 and after appending the terminal ID code, transmits the information to the modem 206 through the wireless device 205. The wireless device 205 modulates the information so as to transmit it to the host 100 through the telephone line 400 at a step Sf4.

When the information controlling computer 104 of the host 100 receives the account information at a step Se2, the amount of the account of each game program installed in each game unit is added up at a step Se3. The information controlling computer 104 determines at a step Se4, game programs which were played only a limited number of times and hence having low earning rates. Thereafter, the information controlling computer 104 is operated to replace the determined game programs and their respective playing instructions with new game programs and playing instructions as described above with reference to FIGS. 5a, 5b, 12a and 12b.

CHANGING A VIDEO GAME PROGRAM BASED ON PLAYING TIMES INFORMATION

Figure 14:
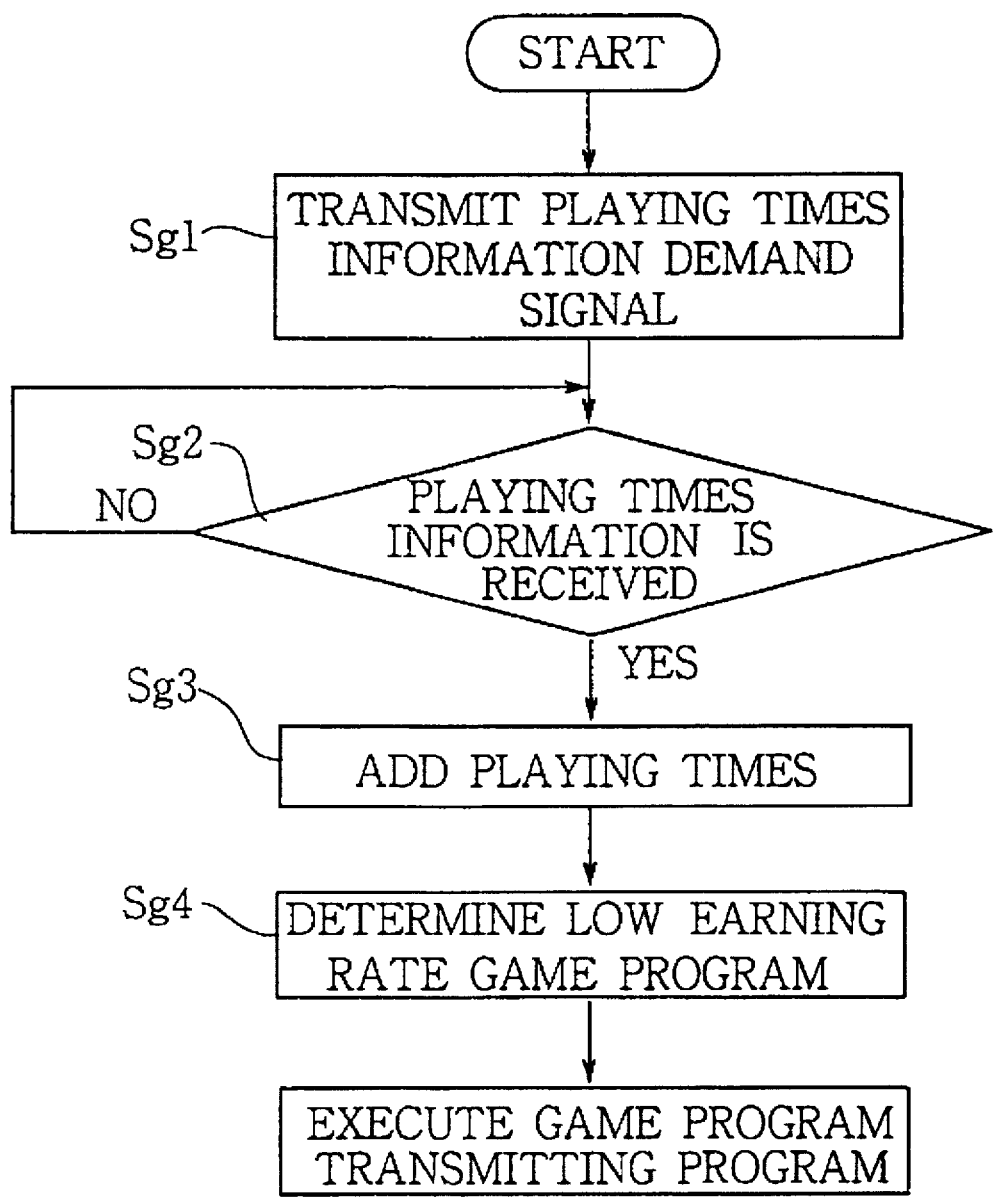
FIGS. 14a and 14b are flowcharts describing operations of the host and the terminal device, respectively, for replacing a video game program based on a playing times information.
Figure 14:
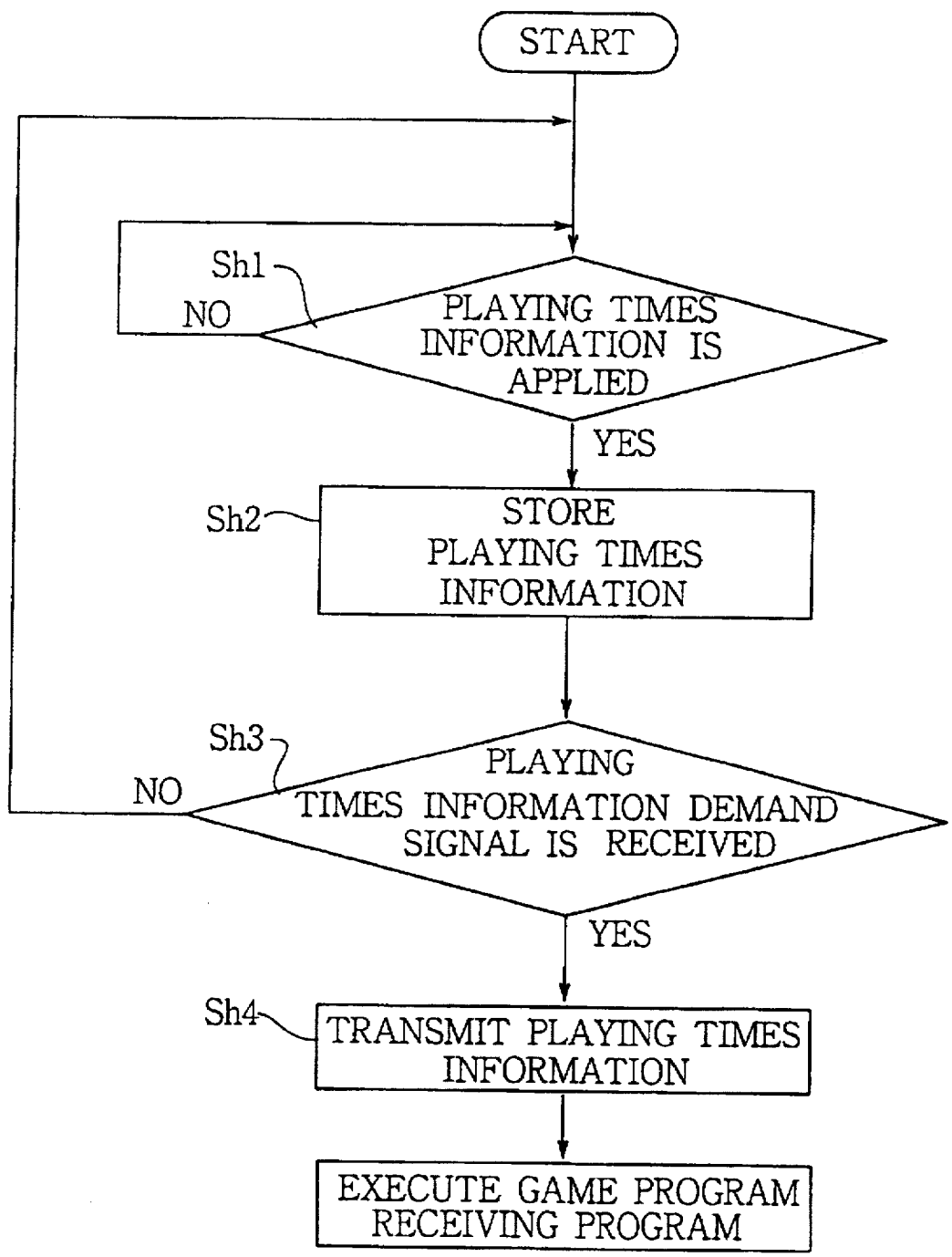

The unprofitable game programs may be similarly exchanged with another programs based on the playing times information which is stored in the playing times collector 204 as shown in FIGS. 14a and 14b.

Referring to FIG. 14b, the data controller 203 confirms at a step Sh1 that playing times information including the number of times each game program was played in each game unit and the ID codes of the game unit and the game program, is applied from the game unit 210 to the playing times information collector 204. The playing times information together with the time and date of the transmission is stored in the playing times information collector 204 at a step Sh2.

Referring to FIG. 14a, at a step Sg1, the information controlling computer 104 of the host 100 periodically, for example, once a month, applies a playing times information demand signal through the satellite transmission line 300 or the telephone line 400 to each terminal device 200 to have the playing times information stored in the playing times information collector 204 transmitted thereto. The data controller 202, detecting the demand signal at a step Sh3, retrieves the game unit ID code, program ID code, the playing times information and the times and dates from the playing times information collector 204 and transmits the information to the modem 206 through the wireless device 205. The modem 206 modulates the information and transmits it to the host 100 through the telephone line 400 at a step Sh4.

When the information controlling computer 104 of the host 100 receives the playing times information at a step Sg2, the number of times each game program in each game unit was played is added up at a step Sg3. The information controlling computer 104 determines at a step Sg4, game programs which were played only a limited number of times and hence having low earning rates. Thereafter, the information controlling computer 104 is operated to replace the determined game programs and their respective playing instructions with new game programs and playing instructions as described above with reference to FIGS. 5a, 5b, 12a and 12b.

The user of the terminal device 200 thus need not trouble to manually calculate the revenue of each program in each game unit and ask the operator of the host 100 to change the program. The unprofitable game programs can be automatically determined and replaced with another instead.

The present invention may be modified to provide a ROM instead of the RAM 213 in each game unit 210, in which case the data controller 202 is provided with a ROM writer and the interface 219 is obviated. In order to replace an unprofitable game program stored in the ROM, the ROM is taken out of the game unit 210 by hand and set in the ROM writer. The ROM writer erases the game program and further writes a new video game program transmitted from the host 100 to the data controller 202. The playing instructions of the games are also stored and erased in the same manner.

From the foregoing it will be understood that the present invention provides a video game system wherein the game programs are efficiently transmitted to a plurality of terminal devices through transmission lines.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A video game system for transmitting video game programs from a host to a plurality of terminal devices through transmission lines, the host having a first memory storing the video game programs, each of the terminal devices having a second memory for storing video game programs sent from the host, and a plurality of game units each of which having a display for displaying the video game programs stored in the second memory, the system comprising:

each of the terminal devices being designated by a terminal device identification data;

each of the video game programs being constituted by a start packet, a data packet, and an end packet, the start packet including a start packet identification code for indicating that the packet is a start packet, at least one first terminal device identification data for identifying the terminal device to which a video game program is transmitted, a game program identification data for identifying the video game program to be transmitted, the data packet including a data packet identification code for indicating that the packet is a data packet, and data of the video game program, the end packet including an end packet identification code for indicating that the packet is an end packet, and a second terminal device identification data for identifying the terminal device which is to be inhibited from receiving the video game program thereafter, the packets being arranged so as to be transmitted in the order of the start packet, data packet and end packet.

2. The system according to claim 1 wherein the start packet is provided at every terminal device to which the video game programs are transmitted.

3. The system according to claim 2 further comprising means for inhibiting the terminal device from receiving the video game program after the completion of the transmission of the data packet in accordance with the terminal device identification data of the start packet.

* * * * *